United States Patent
Matsuyama et al.

(10) Patent No.: US 9,988,543 B2
(45) Date of Patent: Jun. 5, 2018

(54) INK, INK STORED CONTAINER, INKJET RECORDING APPARATUS, AND RECORDED MATTER

(71) Applicants: Akihiko Matsuyama, Shizuoka (JP);
Shigeyuki Harada, Shizuoka (JP);
Yoshiki Yanagawa, Shizuoka (JP);
Masayuki Fukuoka, Tokyo (JP);
Takuya Yamazaki, Shizuoka (JP);
Kazukiyo Nagai, Shizuoka (JP);
Tomoyuki Shimada, Shizuoka (JP);
Akiyoshi Sabu, Shizuoka (JP);
Yuusuke Koizuka, Shizuoka (JP)

(72) Inventors: Akihiko Matsuyama, Shizuoka (JP);
Shigeyuki Harada, Shizuoka (JP);
Yoshiki Yanagawa, Shizuoka (JP);
Masayuki Fukuoka, Tokyo (JP);
Takuya Yamazaki, Shizuoka (JP);
Kazukiyo Nagai, Shizuoka (JP);
Tomoyuki Shimada, Shizuoka (JP);
Akiyoshi Sabu, Shizuoka (JP);
Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 52 days.

(21) Appl. No.: 15/174,063

(22) Filed: Jun. 6, 2016

(65) Prior Publication Data

US 2016/0362572 A1    Dec. 15, 2016

(30) Foreign Application Priority Data

Jun. 12, 2015  (JP) ................................. 2015-119211

(51) Int. Cl.
| | | |
|---|---|---|
| *C09D 11/322* | (2014.01) | |
| *C09D 135/02* | (2006.01) | |
| *B41J 2/175* | (2006.01) | |
| *B41J 29/13* | (2006.01) | |
| *C09D 11/107* | (2014.01) | |

(52) U.S. Cl.
CPC ........... *C09D 11/322* (2013.01); *B41J 2/1752* (2013.01); *B41J 2/17503* (2013.01); *B41J 29/13* (2013.01); *C09D 11/107* (2013.01); *C09D 135/02* (2013.01)

(58) Field of Classification Search
CPC .. C09D 11/322; C09D 11/107; C09D 135/02; B41J 2/17503; B41J 2/1752; B41J 29/13
See application file for complete search history.

(56) References Cited

U.S. PATENT DOCUMENTS

| | | | |
|---|---|---|---|
| 8,960,885 B2 | 2/2015 | Katoh et al. | |
| 8,974,895 B2 | 3/2015 | Naruse et al. | |
| 8,998,400 B2 | 4/2015 | Harada et al. | |
| 9,034,091 B2 | 5/2015 | Matsuyama et al. | |
| 9,217,089 B2 | 12/2015 | Nagai et al. | |
| 9,234,110 B2 | 1/2016 | Katoh et al. | |
| 2012/0113195 A1* | 5/2012 | Katsuragi | C09D 11/38 347/86 |
| 2014/0072779 A1 | 3/2014 | Matsuyama et al. | |
| 2014/0120331 A1 | 5/2014 | Koizuka et al. | |
| 2014/0141209 A1 | 5/2014 | Koizuka et al. | |
| 2014/0242352 A1* | 8/2014 | Naruse | C09D 11/30 428/195.1 |
| 2015/0064418 A1 | 3/2015 | Matsuyama et al. | |
| 2015/0064425 A1 | 3/2015 | Matsuyama et al. | |
| 2015/0109382 A1 | 4/2015 | Naruse et al. | |
| 2015/0116421 A1 | 4/2015 | Nonogaki et al. | |
| 2015/0247049 A1 | 9/2015 | Matsuyama et al. | |
| 2015/0252203 A1 | 9/2015 | Matsuyama et al. | |
| 2015/0259555 A1 | 9/2015 | Katoh et al. | |
| 2015/0291817 A1 | 10/2015 | Katoh et al. | |
| 2015/0307734 A1 | 10/2015 | Nonogaki et al. | |
| 2015/0376425 A1 | 12/2015 | Hakiri et al. | |
| 2016/0017075 A1 | 1/2016 | Harada et al. | |
| 2016/0032037 A1 | 2/2016 | Harada et al. | |
| 2016/0075892 A1 | 3/2016 | Harada et al. | |
| 2016/0102162 A1 | 4/2016 | Harada et al. | |
| 2016/0362572 A1* | 12/2016 | Matsuyama | C09D 11/322 |

FOREIGN PATENT DOCUMENTS

| | | |
|---|---|---|
| JP | 2003-342491 | 12/2003 |
| JP | 2007-238809 | 9/2007 |

* cited by examiner

*Primary Examiner* — Betelhem Shewareged
(74) *Attorney, Agent, or Firm* — Oblon, McClelland, Maier & Neustadt, L.L.P.

(57) ABSTRACT

Provided is an ink containing a copper phthalocyanine pigment, wherein an absorbance ratio (Y/X) of a local minimum absorbance Y of the ink in a wavelength range of from 665 nm through 675 nm to a local maximum absorbance X of the ink in a wavelength range of from 610 nm through 620 nm is 0.660 or greater but 0.740 or less.

9 Claims, 4 Drawing Sheets

US 9,988,543 B2

INK, INK STORED CONTAINER, INKJET RECORDING APPARATUS, AND RECORDED MATTER

CROSS-REFERENCE TO RELATED APPLICATIONS

The present application claims priority under 35 U.S.C. § 119 to Japanese Patent Application No. 2015-119211, filed Jun. 12, 2015. The contents of which are incorporated herein by reference in their entirety.

BACKGROUND OF THE INVENTION

Field of the Invention

The present disclosure relates to inks, ink stored containers, inkjet recording apparatuses, and recorded matters.

Description of the Related Art

Inkjet printers have become remarkably widespread because of advantages such as low noise and low running costs. Color printers capable of performing printing over plain paper have also become a fixture in the market. However, it is very difficult to satisfy all properties needed, such as color reproducibility on an image, scratch resistance, durability, light resistance, driability of an image, character bleeding (feathering), color boundary bleeding (color bleeding), both-side printability, and discharging stability. Therefore, inks to be used are selected based on properties prioritized depending on the purposes.

Copper phthalocyanine pigments are widely used in cyan inks and characterized by an excellent chromogenic property and an excellent light resistance. However, the copper phthalocyanine pigments cannot compete with dyes in a chromogenic property and glossiness, and are particularly problematic in that as the amount of the pigment attached is increased to increase the image density, the color reproduced shifts to a bluish hue and cannot satisfy the cyan hue (L*: 53.9, a*: −37.5, and b*: −50.4) of the standard color (Japan color ver. 2).

As plotted in FIG. 1, the copper phthalocyanine pigments are weakly absorptive in a wavelength range of from 650 nm through 700 nm. Therefore, the color reproduced slightly wears a bluish hue because of insufficient absorption of red light (in a wavelength range of from 620 nm through 750 nm). Hence, if the copper phthalocyanine pigments are able to absorb light in this range more strongly, the color reproduced shifts to a greenish hue and can reproduce the standard color. However, if the light absorption in this range becomes excessively strong, there occurs a problem that the color purity becomes poor to degrade the saturation.

For example, there is proposed an aqueous pigment dispersion in which dispersed particles containing a copper phthalocyanine pigment and an anionic group-containing uncrosslinked organic polymeric compound and dispersed in an aqueous medium have an average particle diameter of from 50 nm through 200 nm, wherein a ratio [(A)/(B)] of absorbance (A) of the aqueous pigment dispersion at a local maximum of absorption in a wavelength range of from 610 nm through 620 nm to absorbance (B) of the aqueous pigment dispersion at a local maximum of absorption in a wavelength range of from 700 nm through 710 nm is in a range of from 1.00 through 1.26 (see, e.g., Japanese Unexamined Patent Application Publication No. 2003-342491).

There is also proposed a water-based ink containing a copper phthalocyanine pigment, wherein a maximum absorbance X of the water-based ink at an absorption peak present in a relatively short wavelength range and a maximum absorbance Y of the water-based ink at an absorption peak present in a relatively long wavelength range satisfy a condition of $0.75 \leq Y/X \leq 0.88$ (see, e.g., Japanese Unexamined Patent Application Publication No. 2007-238809).

SUMMARY OF THE INVENTION

An ink of the present invention contains a copper phthalocyanine pigment. An absorbance ratio (Y/X) of a local minimum absorbance Y of the ink in a wavelength range of from 665 nm through 675 nm to a local maximum absorbance X of the ink in a wavelength range of from 610 nm through 620 nm is 0.660 or greater but 0.740 or less.

DESCRIPTION OF THE EMBODIMENTS (Ink)

Figure 1:
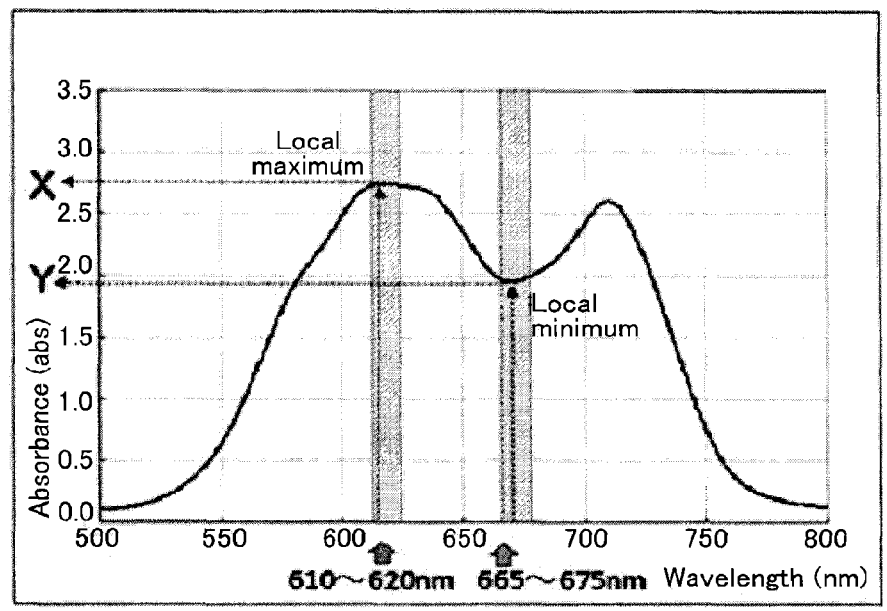
FIG. 1 is a graph of an absorption spectrum of a copper phthalocyanine pigment.

An ink of the present invention contains a copper phthalocyanine pigment. An absorbance ratio (Y/X) of a local minimum absorbance Y of the ink in a wavelength range of from 665 nm through 675 nm to a local maximum absorbance X of the ink in a wavelength range of from 610 nm through 620 nm is 0.660 or greater but 0.740 or less. The ink preferably contains a water-soluble solvent, a copolymer, water, and a permeating agent, and further contains other components as needed.

The ink of the present invention is based on a finding that the techniques described in the related art documents cannot overcome the problem of saturation degradation due to a poor color purity.

The present invention has an object to provide an ink that can overcome the problem that has not been overcome sufficiently by cyan inks using existing copper phthalocyanine pigments, i.e., the problem that an image reproduced has a bluish hue and a color reproduction range of the image is narrow. The ink can provide an image having a more favorable greenish hue, a wide color reproduction range, and a high saturation, and is excellent in storage stability and discharging stability.

The present invention can provide an ink that can overcome the problem that has not been overcome sufficiently by cyan inks using existing copper phthalocyanine pigments, i.e., the problem that an image reproduced has a bluish hue and a color reproduction range of the image is narrow. The ink can provide an image having a more favorable greenish hue, a wide color reproduction range, and a high saturation, and is excellent in storage stability and discharging stability.

In the present invention, an absorbance ratio (Y/X) of a local minimum absorbance Y of the ink in a wavelength range of from 665 nm through 675 nm to a local maximum absorbance X of the ink in a wavelength range of from 610 nm through 620 nm is 0.660 or greater but 0.740 or less.

When the absorbance ratio (Y/X) is 0.660 or greater but 0.740 or less, the ink absorbs red light sufficiently, prevents a color reproduced from shifting to a bluish hue, and can provide a more greenish image having a wide color reproduction range and a high saturation. As a result, a color difference ΔE between L*a*b* measurements of the cyan ink of the present invention and (L*: 53.9, a*: −37.5, and b*: −50.4) of the cyan color of the standard color (Japan color ver. 2) calculated according to a mathematical formula below can satisfy a class B tolerance (where ΔE is 3.2 or greater but 6.5 or less).

$$\text{Color difference } \Delta E = \sqrt{\{(\Delta L^*)^2 + (\Delta a^*)^2 + (\Delta b^*)^2\}}$$

The class B tolerance refers to a color difference level at which compared colors can be perceived as the same color in one's impression.

The absorbance can be measured with, for example, a spectrophotometer (U-3310 available from Hitachi, Ltd.). The ink of the present invention has a pigment concentration of 3.0% by mass, which is too high to measure the absorbance of the ink in an undiluted state of the ink. Hence, the ink is diluted 600 fold with pure water before the measurement, put in a cell made of quartz glass having an optical path length of 10 mm, and then subjected to the measurement. Pure water is used as a reference.

Functional groups on the surface of the copper phthalocyanine pigment, a copolymer (polymer) adsorbed to the surface of the copper phthalocyanine pigment, and dispersion conditions of the pigment such as a dispersed particle diameter and coarse particles are influential to absorption of wavelengths in the range of from 650 nm through 700 nm Among these factors, the condition of adsorption of the copolymer to the surface of the copper phthalocyanine pigment is considered to be the most influential.

<Copper Phthalocyanine Pigment>

The copper phthalocyanine pigment is not particularly limited and may be appropriately selected depending on the intended purpose so long as the copper phthalocyanine pigment has a local maximum absorbance in a wavelength range of from 610 nm through 620 nm and a local minimum absorbance in a wavelength range of from 665 nm through 675 nm. Examples of the copper phthalocyanine pigment include: C.I. Pigment Blue 15:1 and C.I. Pigment Blue 15:2, which are of an α crystal form; C.I. Pigment Blue 15:3 and C.I. Pigment Blue 15:4, which are of a β crystal form; and C.I. Pigment Blue 15:6, which is of an ε crystal form. One of these copper phthalocyanine pigments may be used alone or two or more of these copper phthalocyanine pigments may be used in combination. Among these copper phthalocyanine pigments, C.I Pigment Blue 15:3 and C.I. Pigment Blue 15:4 are preferable in terms of an excellent chromogenic property and an excellent dispersion stability.

The copper phthalocyanine pigment may be a commercially available product. Examples of the commercially available product include product name: INK JET CYAN BG 10 (Pigment Blue 15:3 available from Clariant AG), product name: HELIOGEN BLUE D7110F (Pigment Blue 15:4 available from BASF GmbH), product name: CYANINE BLUE A-220 (Pigment Blue 15:3 available from Dainichiseika Color & Chemicals Mfg. Co., Ltd.), product name: FASTOGEN BLUE TGR-SD (Pigment Blue 15:3 available from DIC Corporation), product name: HELIOGEN BLUE D7029 (Pigment Blue 15:3 available from BASF GmbH), and product name: HOSTAPERM BLUE B4G (Pigment Blue 15:3 available from Clariant AG).

A content of the copper phthalocyanine pigment is preferably 0.5% by mass or greater but 10% by mass or less, more preferably 1% by mass or greater but 7% by mass or less, and yet more preferably 2% by mass or greater but 5% by mass or less of a total amount of the ink. When the content is 0.5% by mass or greater, image density and image saturation are favorable. When the content is 10% by mass or less, ink storage stability is favorable and a clear image is obtained.

<Copolymer>

The copolymer is a polymer that mainly serves as a dispersant of the copper phthalocyanine pigment. In preparation of a pigment dispersion of the copper phthalocyanine pigment in water, use of the copolymer provides a pigment dispersion that is highly dispersed and stable for a long term, because the copolymer containing a naphthyl group at a side-chain terminal easily adsorbs to the surface of the copper phthalocyanine pigment and has a high adsorption force with respect to the copper phthalocyanine pigment.

Examples of the copolymer include acrylic acid-based copolymers, vinyl-based copolymers, polyester-based copolymers, and polyurethane-based copolymers. Among these copolymers, acrylic acid-based copolymers are particularly preferable.

The acrylic acid-based copolymers contain a structural unit represented by a general formula (a) below and a structural unit represented by a general formula (b) below, and may further contain a structural unit derived from any other polymerizable monomer as needed.

The any other polymerizable monomer is not particularly limited and may be appropriately selected depending on the intended purpose. Examples of the any other polymerizable monomer include polymerizable hydrophobic monomers, polymerizable hydrophilic monomers, and polymerizable surfactants.

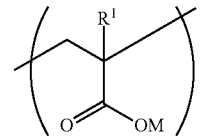

General formula (a)

In the general formula (a), $R^1$ represents a hydrogen atom or a methyl group and M represents a hydrogen atom or a cation.

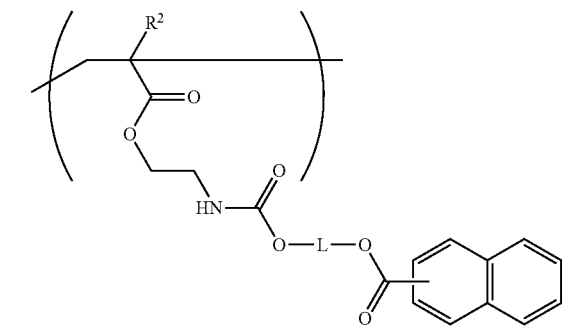

General formula (b)

In the general formula (b), $R^2$ represents a hydrogen atom or a methyl group and L represents an alkylene group containing 2 through 18 carbon atoms.

The copolymer contains the structural unit represented by the general formula (a) above and the structural unit represented by the general formula (b) above.

In the general formula (a), $R^1$ represents a hydrogen atom or a methyl group and M represents a hydrogen atom or a cation. When M represents a cation, the oxygen adjacent to the cation is present in the form of $O^-$.

Examples of the cation include sodium ion, potassium ion, lithium ion, tetramethylammonium ion, tetraethylammonium ion, tetrapropylammonium ion, tetrabutylammonium ion, tetrapentylammonium ion, tetrahexylammonium ion, triethylmethylammonium ion, tributylmethylammonium ion, trioctylmethylammonium ion, 2-hydroxyethyltrimethylammonium ion, tris(2-hydroxyethyl)methylammonium ion, propyltrimethylammonium ion, hexyltrimethylammonium ion, octyltrimethylammonium ion, nonyltrimethylammonium ion, decyltrimethylammonium ion, dodecyltrimethylammonium ion, tetradecyltrimethylammonium ion, hexadecyltrimethylammonium ion, octadecyltrimethylammonium ion, clidodecyldimethylammonium ion, ditetradecyldimethylammonium ion, clihexadecyldimethylammonium ion, dioctadecyldimethylammonium ion, ethylhexadecyldimethylammonium ion, ammonium ion, dimethylammonium ion, trimethylammonium ion, monoethylammonium ion, diethylammonium ion, triethylammonium ion, monoethanolammonium ion, diethanolammonium ion, triethanolammonium ion, methylethanolammonium ion, methyldiethanolammonium ion, dimethylethanolammonium ion, monopropanolammonium ion, dipropanolammonium ion, tripropanolammonium ion, isopropanolammonium ion, morpholinium ion, N-methylmorpholinium ion, N-methyl-2-pyrrolidonium ion, and 2-pyrrolidonium ion. One of these cations may be used alone or two or more of these cations may be used in combination. Among these cations, tetraethylammonium ion is preferable in terms of satisfying both of image density and storage stability.

The copolymer can be increased in affinity with water and can be provided with water dispersibility through neutralization of ionic groups of the copolymer with the cation that may be, for example, an alkali metal and an organic amine but is not hydrogen.

The copolymer becomes a state of being dispersible in water through the neutralization with the cation. When the copper phthalocyanine pigment is added to the copolymer and stirred with, for example, a kneader disperser using balls such as a bead mill and a ball mill, a kneader disperser using a shearing force such as a roll mill, and an ultrasonic disperser, the copolymer can sufficiently wet the copper phthalocyanine pigment and disperse the copper phthalocyanine pigment in water.

In the general formula (b), $R^2$ represents a hydrogen atom or a methyl group and L represents preferably an alkylene group containing 2 through 18 carbon atoms, more preferably an alkylene group containing 2 through 16 carbon atoms, and yet more preferably an alkylene group containing 2 through 12 carbon atoms.

A naphthyl group present at a terminal via L has an excellent pigment adsorbing force that is based on π-π stacking with the copper phthalocyanine pigment, which is a color material in the ink. Therefore, during printing, by the naphthyl group being made to contact with the pigment over a recording medium, the pigment quickly aggregates over the surface of the recording medium and can prevent occurrence of beading (spotty unevenness).

The structural unit represented by the general formula (a) and the structural unit represented by the general formula (b) may constitute a main chain of the copolymer containing a pendant group typically hanging via L, such as a terminal naphthyl group and a side-chain carboxyl group. However, the present invention does not exclude cases where the structural unit represented by the general formula (a) and the structural unit represented by the general formula (b) are partially contained in a side chain, because it is a well-known fact that complete elimination of a side radical polymerization reaction that produces a branch structure is difficult.

The polymerizable hydrophobic monomer is not particularly limited and may be appropriately selected depending on the intended purpose. Examples of the polymerizable hydrophobic monomer include: unsaturated ethylene monomers containing an aromatic ring, such as benzyl (meth)acrylate, styrene, α-methylstyrene, 4-t-butylstyrene, and 4-chloromethylstyrene; alkyl (meth)acrylates such as methyl (meth)acrylate, ethyl (meth)acrylate, n-butyl (meth)acrylate, dimethyl maleate, dimethyl itaconate, dimethyl fumarate, lauryl (meth)acrylate, tridecyl (meth)acrylate, tetradecyl (meth)acrylate, pentadecyl (meth)acrylate, hexadecyl (meth)acrylate, heptadecyl (meth)acrylate, nonadecyl (meth)acrylate, eicosyl (meth) acrylate, heneicosyl (meth) acrylate, and docosyl (meth)acrylate; and unsaturated ethylene monomers containing an alkyl group, such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene. One of these polymerizable hydrophobic monomers may be used alone or two or more of these polymerizable hydrophobic monomers may be used in combination.

The polymerizable hydrophilic monomer is not particularly limited and may be appropriately selected depending on the intended purpose. Examples of the polymerizable hydrophilic monomer include: anionic unsaturated ethylene monomers such as (meth)acrylic acid or salts of (meth) acrylic acid, maleic acid or salts of maleic acid, monomethyl maleate, itaconic acid, monomethyl itaconate, fumaric acid, 4-styrenesulfonic acid, 2-acrylamide-2-methylpropanesulfonic acid, 2-methacryloxyethyl acid phosphoate, and 1-methacryloxyethane-1,1-diphosphonic acid; and nonionic unsaturated ethylene monomers such as (meth)acrylic acid-2-hydroxyethyl, diethylene glycol mono(meth)acrylate, triethylene glycol mono(meth)acrylate, tetraethylene glycol mono(meth)acrylate, polyethylene glycol mono(meth)acrylate, (meth) acrylamide, N-methylol(meth)acrylamide, N-vinylformamide, N-vinylacetamide, N-vinylpyrrolidone, acrylamide, N,N-dimethylacrylamide, N-t-butylacrylamide, N-octylacrylamide, N-t-octylacrylamide, and diacetoneamide. One of these polymerizable hydrophilic monomers may be used alone or two or more of these polymerizable hydrophilic monomers may be used in combination.

Examples of the polymerizable surfactant include anionic surfactants containing at least one radically polymerizable unsaturated double bond group in a molecule and nonionic surfactants containing at least one radically polymerizable unsaturated double bond group in a molecule.

Examples of the anionic surfactants include: hydrocarbon compounds containing a sulfate group such as an ammonium sulfate group (—SO₃⁻NH₄⁺) and an allyl group (—CH₂—CH=CH₂); hydrocarbon compounds containing a sulfate group such as an ammonium sulfate group (—SO₃⁻NH₄⁺) and a methacrylic group [—CO—C(CH₃)=CH₂]; and aromatic hydrocarbon compounds containing a sulfate group such as an ammonium sulfate group (—SO₃⁻NH₄⁺) and a 1-propenyl group (—CH=CH₂CH₃).

Examples of commercially available products of the polymerizable surfactant include: ELEMINOL JS-20 and RS-300 available from Sanyo Chemical Industries, Ltd.; and AQUALON KH-10, AQUALON KH-1205, AQUALON KH-05, AQUALON HS-10, AQUALON HS-1025, AQUALON BC-0515, AQUALON BC-10, AQUALON BC-1025, AQUALON BC-20, and AQUALON BC-2020 available from DKS Co., Ltd.

Examples of the nonionic surfactants include hydrocarbon compounds or aromatic hydrocarbon compounds containing a 1-propenyl group (—CH=CH₂CH₃) and a polyoxyethylene group [—(C₂H₄O)n-H].

The nonionic surfactants may be commercially available products. Examples of the commercially available products include: AQUALON RN-20, AQUALON RN-2025, AQUALON RN-30, and AQUALON RN-50 available from DKS Co., Ltd.; and LATEMUL PD-104, LATEMUL PD-420, LATEMUL PD-430, and LATEMUL PD-450 available from Kao Corporation.

It is preferable to use the polymerizable surfactant in an amount of 0.1% by mass or greater but 10% by mass or less of a total amount of the monomers to constitute the copolymer containing the structural unit represented by the general formula (a) and the structural unit represented by the general formula (b).

A ratio (M1/M2) of an amount M1 by mole of the structural unit represented by the general formula (a) to an amount M2 by mole of the structural unit represented by the general formula (b) in the copolymer is preferably 0.1 or greater but 10 or less, more preferably 0.3 or greater but 5 or less, and yet more preferably 0.5 or greater but 3 or less in terms of the ability to adsorb the copper phthalocyanine pigment.

A mass ratio ((a)/(b)) of the structural unit represented by the general formula (a) to the structural unit represented by the general formula (b) is preferably 37 or greater but 98 or less, more preferably 54 or greater but 95 or less, and yet more preferably 66 or greater but 92 or less in terms of the ability to adsorb the copper phthalocyanine pigment.

The copolymer is obtained by reacting a solvent and the monomer components in the presence of a polymerization initiator under a circulating nitrogen gas stream at a temperature of from 50° C. through 150° C. in a flask equipped with a stirrer, a thermometer, and a nitrogen introducing tube. A viscosity of an aqueous solution or a water dispersion liquid of the synthesized copolymer can be adjusted by changing a molecular weight of the copolymer, or by changing a monomer concentrations, a content of the polymerization initiator, a polymerization temperature, and a polymerization time during polymerization.

There is a tendency that the higher the monomer concentrations during the reaction, the lower molecular weight the copolymer obtained will have, and that the lower the monomer concentrations, the higher molecular weight the copolymer obtained will have.

There is a tendency that the higher the content of the polymerization initiator, the lower molecular weight the copolymer obtained will have, and that the lower the content of the polymerization initiator, the higher molecular weight the copolymer obtained will have.

There is a tendency that the higher the polymerization temperature for a shorter polymerization time, the lower molecular weight the copolymer obtained will have, and that the lower the polymerization temperature for a longer polymerization time, the higher molecular weight the copolymer obtained will have.

Specifically, the copolymer containing the structural unit represented by the general formula (a) and the structural unit represented by the general formula (b) can be synthesized according to methods represented by reaction formulae (1) to (3) below.

First, naphthalenecarbonylchloride (A-1) and an excess amount of a diol compound are made to undergo a condensation reaction in the presence of an acid acceptor such as amine or pyridine, to obtain naphthalene carboxylic acid hydroxyalkyl ester (A-2).

Next, 2-methacryloyloxyethyl isocyanate (A-3) and (A-2) are made to undergo a reaction, to obtain a monomer (A-4).

Next, a (meth)acrylic acid monomer (A-5) and (A-4) are copolymerized in the presence of a radical polymerization initiator, to obtain a copolymer (A-6). Here, a molecular weight of the monomer (A-4) is 357 or greater but 596 or less, because L in the general formula (b) is an alkylene group containing 2 through 18 carbon atoms and R² in the general formula (b) is a hydrogen atom or a methyl group.

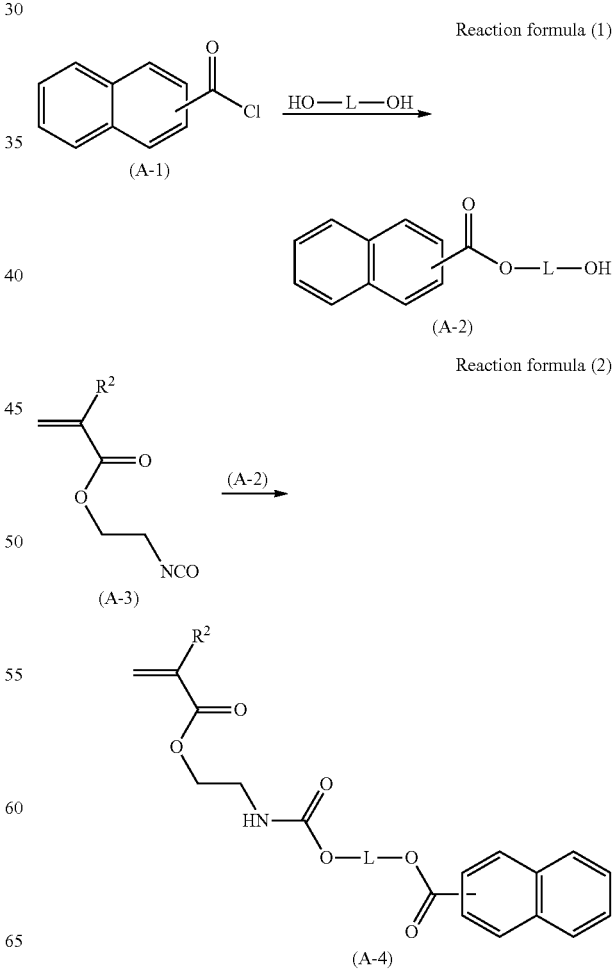

-continued

Reaction formula (3)

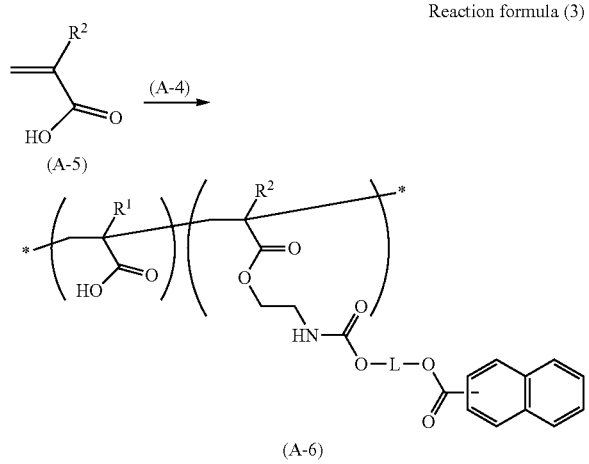

The radical polymerization initiator is not particularly limited and may be appropriately selected depending on the intended purpose. Examples of the radical polymerization initiator include peroxyketal, hydroperoxide, dialkyl peroxide, diacyl peroxide, peroxy dicarbonate, peroxy ester, cyano-based azobis isobutyronitrile, azobis(2-methylbutyronitrile), azobis(2,2'-isovaleronitrile), and non-cyano-based dimethyl-2,2'-azobis isobutyrate. One of these radical polymerization initiators may be used alone or two or more of these radical polymerization initiators may be used in combination. Among these radical polymerization initiators, organic peroxides and azo-compounds are preferable, and azo-compounds are particularly preferable because molecular weight control is easy and a decomposition temperature is low.

A content of the radical polymerization initiator is not particularly limited and may be appropriately selected depending on the intended purpose. However, the content is preferably 1% by mass or greater but 10% by mass or less of a total amount of the polymerizable monomers.

A chain-transfer agent may be added in an appropriate amount in order to adjust a weight average molecular weight of the copolymer.

Examples of the chain-transfer agent include mercaptoacetic acid, mercaptopropionic acid, 2-propanethiol, 2-mercaptoethanol, thiophenol, dodecylmercaptan, 1-dodecanethiol, and thioglycerol.

The polymerization temperature is not particularly limited and may be appropriately selected depending on the intended purpose. However, the polymerization temperature is preferably in a range of from 50° C. through 150° C. and more preferably in a range of from 60° C. through 100° C.

The polymerization time is not particularly limited and may be appropriately selected depending on the intended purpose. However, the polymerization time is preferably in a range of from 3 hours through 48 hours.

The weight average molecular weight of the copolymer is not particularly limited and may be appropriately selected depending on the intended purpose. However, the weight average molecular weight is preferably 3,000 or greater but 60,000 or less, more preferably 5,000 or greater but 40,000 or less, and yet more preferably 10,000 or greater but 30,000 or less. A weight average molecular weight of 3,000 or greater but 60,000 or less is advantageous because the copolymer provides a favorable dispersion stability and a favorable discharging stability when used in an ink.

The weight average molecular weight can be measured by, for example, gel permeation chromatography (GPC).

A ratio by mass (B/A) of a content B (% by mass) of the copper phthalocyanine pigment to a content A (% by mass) of the copolymer is preferably 1.0 or greater but 10.0 or less, more preferably 1.8 or greater but 6.5 or less, and yet more preferably 2.0 or greater but 6.0 or less. When the ratio by mass (B/A) is 1.0 or greater, it is possible to suppress a viscosity to a low level because an amount of the copolymer to leave unadsorbed to the copper phthalocyanine pigment but dissolve in a medium made of water and a water-soluble solvent can be suppressed. This enables stable discharging from inkjet nozzles. When the ratio by mass (B/A) is 10.0 or less, storage stability of the pigment dispersion can be improved.

<Water-Soluble Solvent>

The water-soluble solvent is added for purposes such as prevention of ink drying, improvement of dispersion stability, and prevention of curling of plain paper.

Examples of the water-soluble solvent include polyvalent alcohols, polyvalent alcohol alkylethers, polyvalent alcohol arylethers, nitrogen-containing heterocyclic compounds, amides, amines, sulfur-containing compounds, and 3-ethyl-3-hydroxymethyloxetane. One of these water-soluble solvents may be used alone or two or more of these water-soluble solvents may be used as a mixture.

Examples of the polyvalent alcohols include glycerin, ethylene glycol, diethylene glycol, isopropylidene glycerol, 1,3-butanediol, 3-methyl-1,3-butanediol, triethylene glycol, propylene glycol, dipropylene glycol, trimethylolpropane, trimethylolethane, ethylene glycol, diethylene glycol, dipropylene glycol, tripropylene glycol, tetraethylene glycol, hexylene glycol, polyethylene glycol, polypropylene glycol, methyl triglycol, 1,5-pentanediol, 1,2-hexanediol, 1,6-hexane diol, 1,2,6-hexanetriol, 1,2,4-butanetirol, 1,2,3-butanetriol, 3-methyl-1,3,5-pentanetriol, 3-methoxy-1-butanol, 2-ethyl-1,3-hexanediol, 2,2,4-trimethyl-1,3-pentanediol, 1,12-dodecanediol, and 1,16-hexadecanediol.

Examples of the polyvalent alcohol alkylethers include ethylene glycol monoethylether, ethylene glycol monobutylether, diethylene glycol monomethylether, diethylene glycol monoethylether, diethylene glycol monobutylether, tetraethylene glycol monomethylether, propylene glycol monoethylether, dipropylene glycol monopropylether, and tripropylene glycol monomethylether.

Examples of the polyvalent alcohol arylethers include ethylene glycol monophenylether and ethylene glycol monobenzylether.

Examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam, and γ-butyrolactone.

Examples of the amides include formamide, N-methylformamide, N,N-dimethylformamide, N,N-dimethyl-β-methoxypropionamide, and N,N-dimethyl-β-butoxypropionamide.

Examples of the amines include monoethanolamine, diethanolamine, triethanolamine, monoethylamine, diethylamine, and triethylamine.

Examples of the sulfur-containing compounds include dimetylsulfoxide, sulfolane, and thiodiethanol.

As the water-soluble solvent, propylene carbonate, ethylene carbonate, compounds containing a sugar, and derivatives of the compounds containing a sugar may be used in addition to the compounds presented above.

The compounds containing a sugar are not particularly limited and may be appropriately selected depending on the intended purpose. Examples of the compounds containing a sugar include monosaccharides, disaccharides, oligosaccharides (including trisaccharides and tetrasaccharides), and polysaccharides. Among these compounds containing a sugar, glucose, mannose, fructose, ribose, xylose, arabinose, galactose, maltose, cellobiose, lactose, sucrose, trehalose, and maltotriose are preferable as a wetting agent containing the sugar.

Here, the polysaccharides refer to sugars in a broad sense of the term, and the term is used to encompass various substances present in the natural world, such as α-cyclodextrin and cellulose.

The derivatives of the sugars are not particularly limited and may be appropriately selected depending on the intended purpose. Examples of the derivatives of the sugars include reducing sugars of the sugars, oxidized sugars, amino acids, and thio acid. Among these derivatives of the sugars, sugar alcohols are preferable. Examples of the sugar alcohols include maltitol and sorbit.

The reducing sugars are not particularly limited and may be appropriately selected depending on the intended purpose. Examples of the reducing sugars include sugar alcohols represented by a general formula: $HOCH_2(CHOH)_n CH_2OH$. In the general formula of the reducing sugars, n represents an integer in a range of from 2 through 5.

The oxidized sugars are not particularly limited and may be appropriately selected depending on the intended purpose. Examples of the oxidized sugars include aldonic acid and uronic acid.

Among the water-soluble solvents, 3-ethyl-3-hydroxymethyloxetane, isopropylidene glycerol, N,N-dimethyl-β-butoxypropionamide, glycerin, ethylene glycol monobutylether, 1,3-butanediol, 3-methyl-1,3-butanediol, 2-pyrrolidone, and 2-ethyl-1,3-hexanediol are preferable, and 3-ethyl-3-hydroxymethyloxetane, isopropylidene glycerol, and N,N-dimethyl-β-butoxypropionamide are more preferable.

A content of the water-soluble solvent is preferably 10% by mass or greater but 70% by mass or less and more preferably 20% by mass or greater but 50% by mass or less of the total amount of the ink. In the preferable value range, preferable results are achieved in driability, storage stability, and reliability tests.

<Water>

The water is not particularly limited and may be appropriately selected depending on the intended purpose. Examples of the water include pure water and ultrapure water such as ion-exchanged water, ultrafiltrated water, reverse osmotic water, and distilled water. One of these kinds of water may be used alone or two or more of these kinds of water may be used in combination.

A content of the water is preferably 20% by mass or greater but 80% by mass or less and more preferably 15% by mass or greater but 60% by mass or less of the total amount of the ink. When the content is 20% by mass or greater, viscosity thickening can be prevented to improve discharging stability. When the content is 80% by mass or less, a favorable wettability into a recording medium is obtained to improve image qualities.

<Permeating Agent>

The permeating agent can suppress a surface tension of the ink into which the permeating agent is added to improve a nozzle filling property of the ink and discharging stability of the ink, and in addition, can make the ink quickly permeable into a recording medium after ink droplets land on the recording medium to suppress feathering and color bleeding.

Examples of the permeating agent include surfactants and solvents having permeability.

—Surfactant—

Examples of the surfactants include anionic surfactants, nonionic surfactants, amphoteric surfactants, fluorosurfactants, and acetylene-based surfactants.

Examples of the anionic surfactants include polyoxyethylene alkylether acetic acid salts, dodecylbenzene sulfonic acid salts, lauric acid salts, and polyoxyethylene alkylether sulfate salts.

Examples of the nonionic surfactants include polyols, glycolethers, polyoxyethylene alkylethers, polyoxyethylene alkyl esters, polyoxyethylene sorbitan fatty acid esters, polyoxyethylene alkylphenylethers, polyoxyethylene alkylamines, polyoxyethylene alkylamides, and acetylene glycol.

Examples of the fluorosurfactants include perfluoroalkyl sulfonic acid salts, perfluoroalkyl carboxylic acid salts, perfluoroalkyl phosphoric acid esters, perfluoroalkyl-ethylene oxide adducts, perfluoroalkyl betaines, perfluoroalkylamine oxides, and perfluoroalkylether compounds. Among these fluorosurfactants, fluorosurfactants represented by a general formula (1) below and fluorosurfactants represented by a general formula (2) below are preferable.

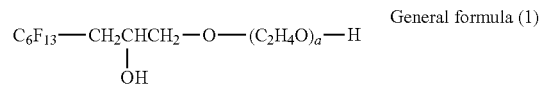

In the general formula (1), a represents 8 or 9.

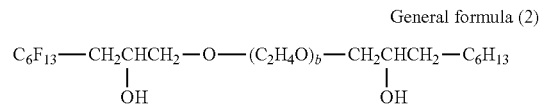

In the general formula (2), b represents 8 or 9.

Examples of the acetylene-based surfactants include 2,4,7,9-tetramethyl-5-desine-4,7-diol, 3,6-dimethyl-4-octyne-3,6-diol, and 3,5-dimethyl-1-hexyn-3-ol.

Examples of commercially available products of the acetylene-based surfactants include SURFYNOL 104, 82, 465, and 485 or TG available from Air Products and Chemicals, Inc. Among these commercially available products, SURFYNOL 104, 465, and TG are preferable.

—Solvent Having Permeability—

Examples of the solvent having permeability include: polyols containing 8 or more carbon atoms such as 2-ethyl-1,3-hexanediol and 2,2,4-trimethyl-1,3-pentanediol; and glycolethers. One of these solvents may be used alone or two or more of these solvents may be used in combination.

A content of the permeating agent is preferably 0.01% by mass or greater but 5% by mass or less and more preferably 0.03% by mass or greater but 2% by mass or less of the total amount of the ink. When the content is 0.01% by mass or greater, image density and saturation can be maintained high because printed dots spread sufficiently and can fill a solid image in full. When the content is 5% by mass or less, ink droplets can be discharged favorably because foaming is suppressed and flow paths in nozzles will not be clogged with foams.

<Other Components>

The other components are not particularly limited and may be appropriately selected depending on the intended purpose. Examples of the other components include a pH adjuster, an antiseptic/fungicide, an anti-rust agent, an antioxidant, an ultraviolet absorber, a kogation inhibitor, an oxygen absorber, and a light stabilizer.

—pH Adjuster—

The pH adjuster is added in order to stabilize a dispersion state and stabilize discharging. However, at pH of 11 or higher, an amount of an inkjet head or an ink supplying unit to be eluted is high. This leads to problems such as ink property change, leak, and discharging troubles. It is preferable to add the pH adjuster in kneading and dispersing the pigment together with the dispersant in water. This is because if the pH adjuster is added together with additives such as the water-soluble solvent and the permeating agent after the kneading and dispersing, the addition of the pH adjuster may destroy the dispersion depending on the kind of the pH adjuster.

Examples of the pH adjuster include alcohol amines, alkali metal hydroxides, ammonium hydroxides, phosphonium hydroxides, and alkali metal carbonates.

Examples of the alcohol amines include diethanolamine, triethanolamine, and 2-amino-2-ethyl-1,3-propanediol.

Examples of the alkali metal hydroxides include lithium hydroxide, sodium hydroxide, and potassium hydroxide.

Examples of the ammonium hydroxides include ammonium hydroxide and quaternary ammonium hydroxide.

Examples of the phosphonium hydroxides include quaternary phosphonium hydroxide.

Examples of the alkali metal carbonates include lithium carbonate, sodium carbonate, and potassium carbonate.

—Antiseptic/Fungicide—

Examples of the antiseptic/fungicide include sodium dehydroacetate, sodium sorbate, sodium 2-pyridinethiol-1-oxide, sodium benzoate, and pentachlorophenol sodium.

—Anti-Rust Agent—

Examples of the anti-rust agent include acidic sulfites, sodium thiosulfate, ammonium thiodiglycolate, diisopropylammonium nitrite, pentaerythritol tetranitrate, and dicyclohexylammonium nitrite.

—Antioxidant—

Examples of the antioxidant include phenol-based antioxidants (including hindered phenol-based antioxidants), amine-based antioxidants, sulfur-based antioxidants, and phosphorus-based antioxidant.

—Ultraviolet Absorber—

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

—Kogation Inhibitor—

Kogation is a trouble in a thermal head configured to discharge an ink utilizing a foaming power of the ink obtained by flowing an electric current through a heater and heating the ink instantaneously. Kogation refers to a phenomenon that the components of the ink change properties when the ink is heated and the matters resulting from the property changes adhere to the heater. When kogation occurs, heating by the heater will not be performed normally to weaken a discharging power, or in the worst case, fail to discharge the ink.

Examples of the kogation inhibitor include polyphosphoric acid, polyaminocarboxylic acid, aldonic acid, hydroxycarboxylic acid, polyol phosphoric acid esters, salts of these substances, acids containing an amino group or salts of the acids containing an amino group, and ammonium salts of acids containing a methyl group or a methylene group and a carboxyl group. One of these kogation inhibitors may be used alone or two or more of these kogation inhibitors may be used in combination.

<Method for Producing Ink>

As a method for producing the ink, the ink can be produced by, for example, stirring and mixing the copper phthalocyanine pigment, preferably the water, the water-soluble solvent, and the copolymer, and as needed, the other components. For the stirring and mixing, for example, a sand mill, a homogenizer, a ball mill, a paint shaker, an ultrasonic disperser, a stirrer using a typical stirring blade, a magnetic stirrer, and a high-speed disperser may be used.

In production of the ink, it is preferable to filter out coarse particles with, for example, a filter or a centrifuge, and degas the ink.

A viscosity of the ink is preferably 3 mPa·s or higher but 20 mPa·s or lower at 25° C. in terms of image qualities such as a quality of characters recorded over a recording medium.

The ink of the present invention can be favorably used for an ink stored container and various recording apparatuses according to an inkjet recording method, for example, an inkjet recording printer, a facsimile apparatus, a copier apparatus, and a printer/facsimile/copier multifunction peripherals.

(Ink Stored Container)

An ink stored container of the present invention includes the ink of the present invention and a container storing the ink, and may further include other members appropriately selected as needed.

The container is not particularly limited and may be of any shape, any structure, any size, any material, etc. that may be appropriately selected depending on the intended purpose. Preferable examples of the container include a container including an ink bag made of, for example, an aluminium laminate film and a resin film.

Figure 4:
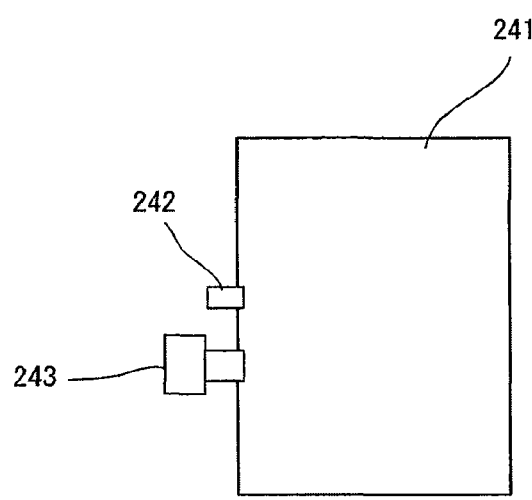
FIG. 4 is a schematic view illustrating an example of an ink bag of an ink stored container of the present invention.
Figure 5:
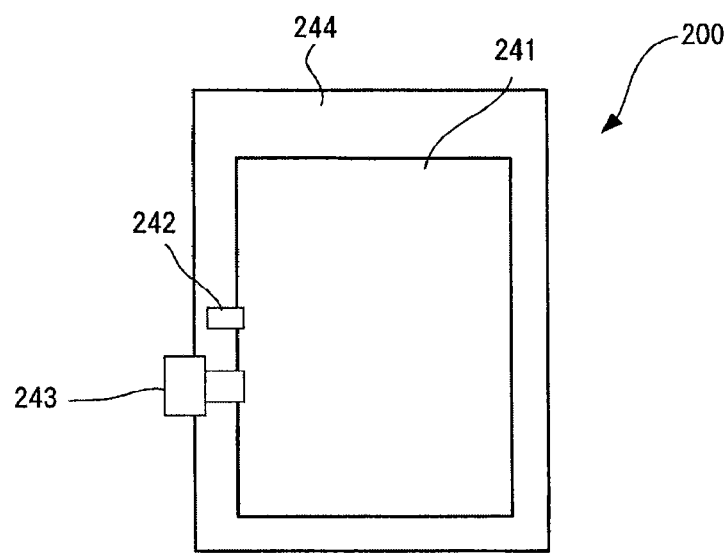
FIG. 5 is a schematic view illustrating an ink stored container, which is the ink stored container that stores as a case, the ink bag of FIG. 4.

An example of the ink stored container will be described with reference to FIG. 4 and FIG. 5. FIG. 4 is a schematic view illustrating an example of an ink bag 241 of the ink stored container of the present invention. FIG. 5 is a schematic view illustrating an ink stored container 200 storing the ink bag 241 of FIG. 4 in an ink stored container case 244.

As illustrated in FIG. 4, the ink bag 241 is filled with an ink through an ink injecting port 242, and after evacuation of air remaining in the ink bag, the ink injecting port 242 is closed by fusion bonding. For use, an ink discharging port 243 made of a rubber material is pierced with a needle of a body of an apparatus in order for the ink to be supplied into the apparatus. The ink bag 241 is made of a gas-impermeable packaging material such as an aluminium laminate film. As illustrated in FIG. 5, the ink bag 241 is typically stored in the ink stored container case 244 made of plastic, and in the form of the ink stored container 200, used as attached onto various inkjet recording apparatuses in an attachable/detachable manner. The stored container of the present invention is particularly preferably used as attached on an inkjet recording apparatus of the present invention described below in an attachable/detachable manner.

(Inkjet Recording Apparatus and Inkjet Recording Method)

An inkjet recording apparatus of the present invention includes the ink stored container of the present invention and a discharging unit configured to discharge an ink supplied from the ink stored container, and further includes other units as needed.

An inkjet recording method of the present invention uses an inkjet recording apparatus including the ink stored container of the present invention, and includes a discharging step of discharging an ink supplied from the ink stored container, and further includes other steps as needed.

<Discharging Unit and Discharging Step>

The discharging unit is a unit configured to discharge an ink supplied from the ink stored container, and is a unit configured to apply a stimulus to the ink of the present invention to fly the ink and record an image over a recording medium.

The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

Examples of an ink flying method used for the ink includes: a so-called piezo method (see, e.g., Japanese Examined Patent Publication No. 02-51734) using a piezoelectric element as a pressure generating unit to pressurize an ink in an ink flow path to deform a vibration plate constituting a wall surface of the ink flow path and change the internal cubic capacity of the ink flow path to discharge ink droplets; a so-called thermal method (see, e.g., Japanese Examined Patent Publication No. 61-59911) using a heating resistor to heat an ink in an ink flow path and generate bubbles; and an electrostatic method (see, e.g., Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal cubic capacity of the ink flow path to discharge ink droplets.

A size of the ink droplets to be flown is preferably 3 pl or greater but 40 pl or less. A discharging/jetting speed of the ink droplets is preferably 5 m/s or higher but 20 m/s or lower. A driving frequency for flying the ink droplets is preferably 1 kHz or higher. A resolution of the ink droplets is preferably 300 dpi or higher.

<Other Units and Other Steps>

Examples of the other units include a heating unit, a stimulus generating unit, and a controlling unit.

Many known devices may be used as the heating unit. Examples of the heating unit include devices for, for example, forced-air heating, radiation heating, conduction heating, high-frequency drying, and microwave drying. One of these heating units may be used alone or two or more of these heating units may be used in combination.

A temperature for the heating may be varied depending on the kind and amount of the water-soluble solvent contained in the ink and a minimum filming temperature of a resin emulsion added, and may also be varied depending on the kind of a base material to be printed.

The temperature for the heating is preferably high, more preferably 40° C. or higher but 120° C. or lower, and yet more preferably 50° C. or higher but 90° C. or lower in terms of driability and a filming temperature.

Examples of the stimulus generating unit include heating devices, pressure devices, piezoelectric elements, vibration generating devices, ultrasonic oscillators, and lights. Specific examples of the stimulus generating unit include: piezoelectric actuators such as piezoelectric elements; thermal actuators using an electro-thermal converting element such as a heating resistor to utilize a phase change upon film boiling of a liquid; shape memory alloy actuators utilizing a phase change of a metal upon a temperature change; and electrostatic actuators utilizing an electrostatic force.

The controlling unit is not particularly limited and may be appropriately selected depending on the intended purpose so long as the controlling unit is capable of controlling the operations of each unit. Examples of the controlling unit include devices such as a sequencer and a computer.

Here, an example of the inkjet recording apparatus of the present invention will be described with reference to the drawings.

Figure 6:
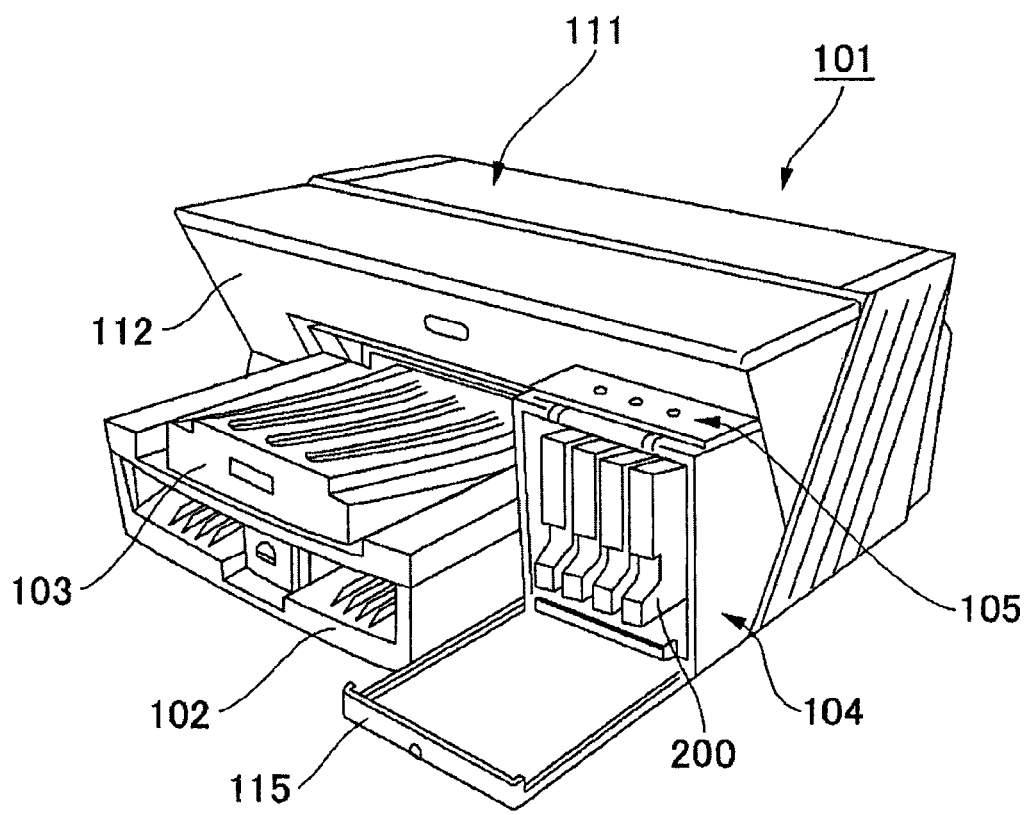
FIG. 6 is a schematic perspective view illustrating an example of an inkjet recording apparatus of the present invention in a state that a cover of an ink stored container loading portion is opened.

An inkjet recording apparatus illustrated in FIG. 6 includes an apparatus body 101, a paper feeding tray 102 attached on the apparatus body 101 and configured to load the apparatus body 101 with sheets, a paper ejecting tray 103 that is attached on the apparatus body 101 and over which sheets having a recorded (formed) image are stocked, and an ink stored container loading portion 104. An operating unit 105 such as operating keys and a display is provided over a top surface of the ink stored container loading portion 104. The ink stored container loading portion 104 includes an openable/closable front cover 115 to be loaded and unloaded with ink stored containers 200. The reference numeral 111 denotes a head cover, and 112 denotes a front surface of the front cover.

Figure 7:
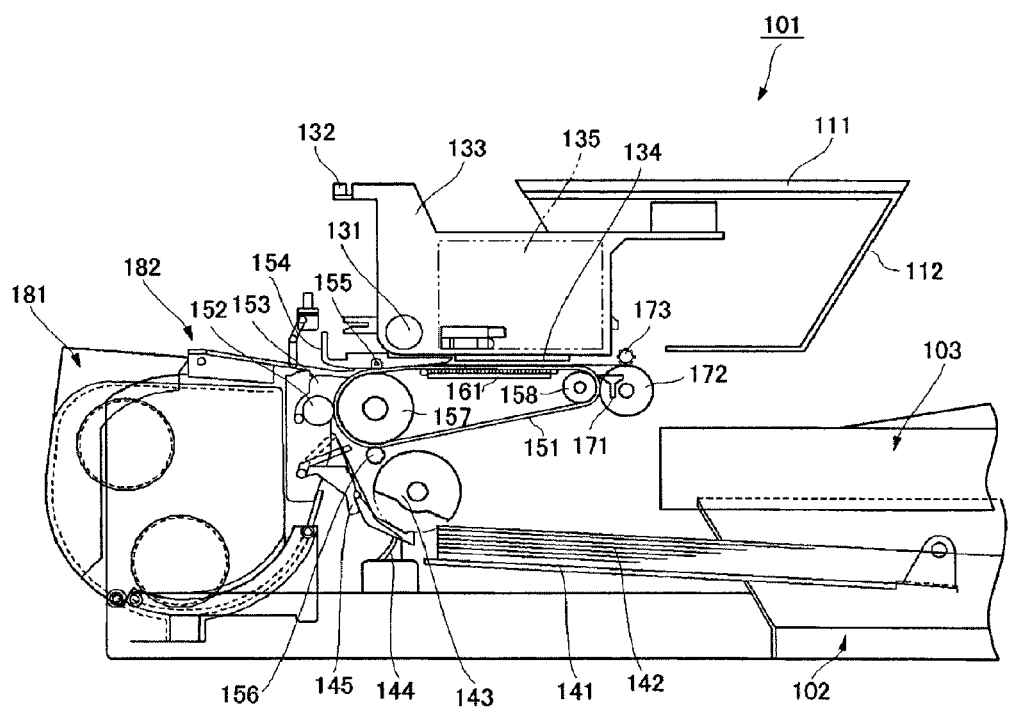
FIG. 7 is a schematic view illustrating an example of an inkjet recording apparatus of the present invention.

As illustrated in FIG. 7, in the apparatus body 101, a carriage 133 is supported in a manner slidable in a main-scanning direction on a guide rod 131 and a stay 132, which are guide members provided from left to right in a lateral bridging manner, and is configured to be moved and scanned by a main scanning motor.

Recording heads 134 including four inkjet recording heads configured to discharge ink droplets of yellow (Y), cyan (C), magenta (M), and black (Bk) colors are attached in the carriage 133 in a manner that a plurality of ink discharging ports are arranged in a direction perpendicular to the main-scanning direction and a direction in which ink droplets are discharged faces downward.

The inkjet recording heads constituting the recording heads 134 may be inkjet recording heads including as a unit configured to generate energy for discharging inks, a piezoelectric actuator such as a piezoelectric element, a thermal actuator using an electro-thermal converting element such as a heating resistor to utilize a phase change upon film boiling of a liquid, a shape memory alloy actuator utilizing a phase change of a metal upon a temperature change, an electrostatic actuator utilizing an electrostatic force, etc.

The carriage 133 is mounted with sub tanks 135 for the colors configured to supply inks of the colors into the recording heads 134. The sub tanks 135 are supplied and replenished with inks of an ink set of the present invention from the ink stored containers 200 loaded in the ink stored container loading portion 104.

A paper feeding unit configured to feed sheets 142 stacked over a paper stacking portion (pressure plate) 141 of the paper feeding tray 102 includes a semicircular roll [paper feeding roll 143] configured to feed the sheets 142 one by one separately from the paper stacking portion 141 and a separation pad 144 disposed counter to the paper feeding roll 143 and made of a material having a high friction coefficient. The separation pad 144 is biased toward the paper feeding roll 143.

A conveying unit configured to convey a sheet 142 fed from the paper feeding unit below the recording heads 134 includes a conveying belt 151 configured to electrostatically attract and convey the sheet 142, a counter roller 152 configured to convey the sheet 142 brought from the paper feeding unit through a guide 145 while nipping the sheet 142 between the conveying belt 151 and the counter roller 152, a conveying guide 153 configured to make the sheet 142, which is brought approximately vertically upward, change course by about 90° and follow the conveying belt 151, and a leading end pressing roll 155 biased toward the conveying belt 151 by a pressing member 154. There is also provided a charging roller 156, which is a charging unit configured to charge a surface of the conveying belt 151.

The conveying belt 151 is an endless belt, is tensed between a conveying roller 157 and a tension roller 158, and is rotatable in a belt conveying direction. The conveying belt 151 includes an external layer constituting a sheet attracting surface and made of a resistance-uncontrolled resin material having a thickness of about 40 μm [e.g., a tetrafluoroethylene-ethylene copolymer (ETFE)], and a back layer (an intermediate resistance layer or an earth layer) made of the same material as the external layer and subjected to resistance control with carbon. A guide member 161 is disposed at the back side of the conveying belt 151 at a position corresponding to a printing region of the recording heads 134. A paper ejecting unit configured to eject a sheet 142 recorded by the recording heads 134 includes a separation claw 171 configured to separate the sheet 142 from the conveying belt 151, a paper ejecting roller 172, and a paper ejecting roll 173. The paper ejecting tray 103 is disposed below the paper ejecting roller 172.

A both-side paper feeding unit 181 is attached on a rear surface of the apparatus body 101 in an attachable/detachable manner. The both-side paper feeding unit 181 is configured to take in a sheet 142 that is returned by means of reverse rotation of the conveying belt 151, overturn the sheet 142, and feed the sheet 142 to between the counter roller 152 and the conveying belt 151 again. A manual paper feeding unit 182 is provided over a top surface of the both-side paper feeding unit 181.

In the recording apparatus described above, each sheet 142 is fed from the paper feeding unit one by one separately, fed approximately vertically upward, guided by the guide 145, and conveyed while being nipped between the conveying belt 151 and the counter roller 152. Furthermore, the leading end of the sheet 142 is guided by the conveying guide 153 and pressed onto the conveying belt 151 by the leading end pressing roll 155, such that the conveying course of the sheet 142 is changed by about 90°.

Here, because the conveying belt 151 is charged by the charging roller 156, the sheet 142 is conveyed by the conveying belt 151 while being electrostatically attracted to the conveying belt 151. Then, by the carriage 133 being moved, the recording heads 134 are driven according to an image signal to discharge ink droplets and record one line over the sheet 142 that is being stopped. Then, the sheet 142 is conveyed by a predetermined amount, and the next line is recorded over the sheet 142. Upon reception of a recording completion signal or a signal indicative of arrival of the trailing end of the sheet 142 at the recording region, the recording operation is completed and the sheet 142 is ejected onto the paper ejecting tray 103.

When a near-end of the amount of inks remaining in the sub tanks 135 is sensed, inks are replenished in a needed amount into the sub tanks 135 from the ink stored containers 200.

In the recording apparatus, when the inks in the ink stored containers 200 are used up, the casings of the ink stored containers 200 can be disassembled and the ink bags put inside can only be exchanged. The ink stored containers 200 can supply inks stably even when the ink stored containers 200 are installed upright at a front loading position. Therefore, even when the apparatus body 101 is set in a state of being blocked overhead, for example, when the apparatus body 101 is stored in a rack or when a thing is placed on top of the apparatus body 101, it is possible to exchange the ink stored containers 200 easily.

An example in which the present invention is applied to a serial-type (shuttle-type) inkjet recording apparatus including a scanning carriage has been described above. However, the present invention can also be applied to a line-type inkjet recording apparatus equipped with a line-type head.

(Recorded Matter)

A recorded matter of the present invention includes a recording medium and an image recorded over the recording medium with the ink of the present invention.

The recorded matter has high image qualities with no bleeding, has an excellent temporal stability, and can be favorably used for various purposes as a handout over which various types of printing or images are recorded, etc.

The recording medium is not particularly limited and may be appropriately selected depending on the intended purpose. Examples of the recording medium include plain paper, coated paper for printing, gloss paper, special paper, cloth, films, and OHP sheets. One of these recording media may be used alone or two or more of these recording media may be used in combination. Among these recording media, plain paper and coated paper for printing are preferable. The plain paper is advantageous in inexpensiveness. The coated paper for printing is advantageous in less expensiveness than gloss paper and providing a smooth and gloss image.

Details about the recording medium are not particularly limited and may be appropriately selected depending on the intended purposes. For example, descriptions in Japanese Unexamined Patent Application Publication No. 2012-111845 in paragraphs [0068] to [0080] may be referred to.

EXAMPLES

The present invention will be described below by way of Examples. However, the present invention should not be construed as being limited to the Examples.

Copolymer Synthesis Example 1

Synthesis of Copolymer a 1,6-Hexanediol (available from Tokyo Chemical Industry Co., Ltd.) (62.0 g (525 mmol)) was dissolved in methylene chloride (700 mL), and pyridine (20.7 g (262 mmol)) was added to the resultant.

To this solution, a solution obtained by dissolving 2-naphthalene carbonyl chloride (available from Tokyo Chemical Industry Co., Ltd.) (50.0 parts by mass (262 mmol)) in methylene chloride (100 mL) was dropped in 2 hours with stirring. Then, the resultant was stirred at room temperature for 6 hours. The obtained reaction solution was washed with water. Then, an organic phase was isolated from the reaction solution, dried with magnesium sulfate, and evacuated of the solvent by distillation. The matter that survived the distillation was purified by silica gel column chromatography using a mixture solvent of methylene chloride/methanol (at a ratio by volume of 98/2) as an eluent, to obtain 2-naphtoic acid-2-hydroxyethyl ester (52.5 parts by mass).

Next, the 2-naphtoic acid-2-hydroxyethyl ester (42.1 parts by mass (155 mmol)) was dissolved in dry methyl ethyl ketone (80 mL) and heated to 60° C. To this solution, a solution obtained by dissolving 2-methacryloyloxyethyl isocyanate (KARENZ MOI available from Showa Denko K.K.) (24.0 parts by mass (155 mmol)) in dry methyl ethyl ketone (20 mL) was dropped in 1 hour with stirring. Then, the resultant was stirred at 70° C. for 12 hours, cooled to room temperature, and evacuated of the solvent by distillation. The matter that survived the distillation was purified by silica gel column chromatography using a mixture solvent of methylene chloride/methanol (at a ratio by volume of 99/1) as an eluent, to obtain a monomer M-1 (57.0 parts by mass) represented by a structural formula (b-1) below.

Structural formula (b-1)

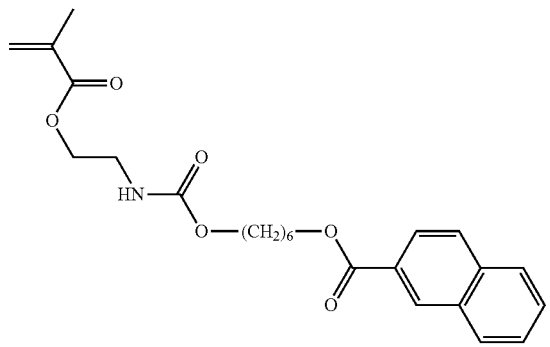

Next, acrylic acid (available from Sigma-Aldrich Corporation) (1.20 parts by mass (16.7 mmol)) and the monomer M-1 (7.12 parts by mass (16.7 mmol)) were dissolved in dry methyl ethyl ketone (40 mL), to prepare a monomer solution.

Next, 10% by mass of the monomer solution was heated to 75° C. under an argon gas stream. To this monomer solution, a solution obtained by dissolving 2,2'-azoiso(butyronitrile) (available from Tokyo Chemical Industry Co., Ltd.) (0.273 g (1.67 mmol)) in the remaining monomer solution was dropped in 1.5 hours. The resultant was stirred at 70° C. for 7 hours and then cooled to room temperature, and the obtained reaction solution was fed to hexane. A resultant deposited copolymer was filtered and dried at reduced pressure, to obtain a copolymer (8.13 parts by mass).

The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer a.

A weight average molecular weight of the obtained copolymer a measured in the manner described below was 10,400.

<Measurement of Weight Average Molecular Weight>

A weight average molecular weight was measured according to a CPC method using a column thermostat bath (CTO-20A available from Shimadzu Corporation), a detector (RID-10A available from Shimadzu Corporation), an eluent flow path pump (LC-20AD available from Shimadzu Corporation), a degasser (DGU-20A available from Shimadzu Corporation), and an autosampler (SIL-20A available from Shimadzu Corporation). Columns used were aqueous SEC columns TSKGEL G3000PWXL having an elimination limit molecule quantity of $2\times10^5$, TSKGEL G5000PWXL having an elimination limit molecule quantity of $2.5\times10^6$, and TSKGEL G6000PWXL having an elimination limit molecule quantity of $5\times10^7$ (available from Tosoh Corporation), and the columns were coupled in use. A sample used was a 2 g/100 ml preparation of the copolymer a with an eluent. The eluent was an aqueous solution in which contents of acetic acid and sodium acetate were both adjusted to 0.5 mol/L. A column temperature was 40° C. A flow rate was 1.0 ml/min. A calibration curve was generated using 9 kinds of polyethylene glycol standard samples having molecular weights of 1,065, 5,050, 24,000, 50,000, 107,000, 140,000, 250,000, 540,000, and 920,000.

Copolymer Synthesis Example 2

Synthesis of Copolymer b

A copolymer was obtained in the same manner as in Copolymer Synthesis Example 1, except that acrylic acid and the monomer M-1 were reacted at 60° C. for 12 hours unlike in Copolymer Synthesis Example 1. The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer b.

A weight average molecular weight of the obtained copolymer b measured in the same manner as in Copolymer Synthesis Example 1 was 23,500.

Copolymer Synthesis Example 3

Synthesis of Copolymer c

A copolymer was obtained in the same manner as in Copolymer Synthesis Example 1, except that acrylic acid and the monomer M-1 were reacted at 55° C. for 16 hours unlike in Copolymer Synthesis Example 1. The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer c.

A weight average molecular weight of the obtained copolymer c measured in the same manner as in Copolymer Synthesis Example 1 was 29,600.

Copolymer Synthesis Example 4

Synthesis of Copolymer d

A copolymer was obtained in the same manner as in Copolymer Synthesis Example 1, except that acrylic acid was changed to methacrylic acid (available from Sigma-Aldrich Corporation) unlike in Copolymer Synthesis Example 1. The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer d.

A weight average molecular weight of the obtained copolymer d measured in the same manner as in Copolymer Synthesis Example 1 was 9,300.

Copolymer Synthesis Example 5

Synthesis of Copolymer e

A copolymer was synthesized in the same manner as in Copolymer Synthesis Example 2, except that the ratio of acrylic acid and the monomer M-1 in Copolymer Synthesis Example 2 was changed to a ratio presented in Table 1. The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer e.

A weight average molecular weight of the obtained copolymer e measured in the same manner as in Copolymer Synthesis Example 1 was 23,000.

Copolymer Synthesis Example 6

Synthesis of Copolymer f

A copolymer was synthesized in the same manner as in Copolymer Synthesis Example 2, except that the ratio of acrylic acid and the monomer M-1 in Copolymer Synthesis Example 2 was changed to a ratio presented in Table 1. The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer f.

A weight average molecular weight of the obtained copolymer f measured in the same manner as in Copolymer Synthesis Example 1 was 22,800.

Copolymer Synthesis Example 7

Synthesis of Copolymer g

A copolymer was synthesized in the same manner as in Copolymer Synthesis Example 2, except that the ratio of acrylic acid and the monomer M-1 in Copolymer Synthesis Example 2 was changed to a ratio presented in Table 1. The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer g.

A weight average molecular weight of the obtained copolymer g measured in the same manner as in Copolymer Synthesis Example 1 was 23,300.

Copolymer Synthesis Example 8

Synthesis of Copolymer h

A monomer M-2 represented by a structural formula (b-2) below was obtained in the same manner as in Copolymer Synthesis Example 1, except that 1,6-hexanediol was changed to ethylene glycol (available from Tokyo Chemical Industry Co., Ltd.) unlike in Copolymer Synthesis Example 1.

Structural formula (b-2)

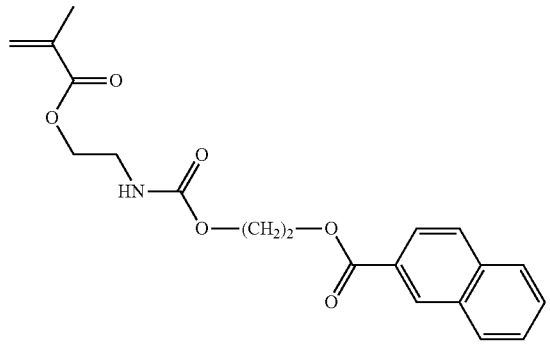

Next, acrylic acid (available from Sigma-Aldrich Corporation) (1.20 parts by mass (16.7 mmol)) and the monomer M-2 (7.12 parts by mass (16.7 mmol)) were dissolved in dry methyl ethyl ketone (40 mL), to prepare a monomer solution. Ten percent by mass of the monomer solution was heated to 75° C. under an argon gas stream. To this monomer solution, a solution obtained by dissolving 2,2'-azoiso(butyronitrile) (available from Tokyo Chemical Industry Co., Ltd.) (0.273 g (1.67 mmol)) in the remaining monomer solution was dropped in 1.5 hours. The resultant was stirred at 75° C. for 6 hours and then cooled to room temperature, and the obtained reaction solution was fed to hexane. A resultant deposited copolymer was filtered and dried at reduced pressure, to obtain a copolymer (8.13 parts by mass).

The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer h.

A weight average molecular weight of the obtained copolymer h measured in the same manner as in Copolymer Synthesis Example 1 was 8,700.

Copolymer Synthesis Example 9

Synthesis of Copolymer i

A monomer M-3 represented by a structural formula (b-3) below was obtained in the same manner as in Copolymer Synthesis Example 1, except that 1,6-hexanediol was changed to 1,12-dodecanediol (available from Tokyo Chemical Industry, Co., Ltd.) unlike in Copolymer Synthesis Example 1.

Structural formula (b-3)

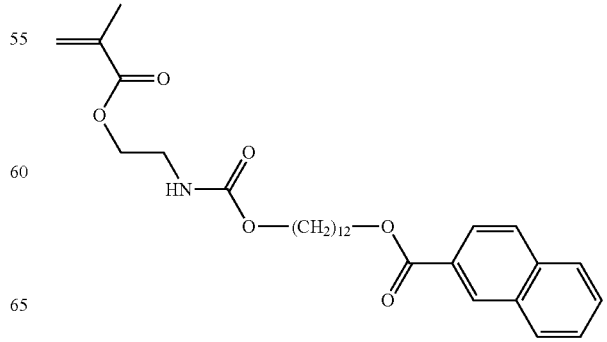

Next, acrylic acid (available from Sigma-Aldrich Corporation) (1.20 parts by mass (16.7 mmol)) and the monomer M-3 (7.12 parts by mass (16.7 mmol)) were dissolved in dry methyl ethyl ketone (40 mL), to prepare a monomer solution. Ten percent by mass of the monomer solution was heated to 75° C. under an argon gas stream. To this monomer solution, a solution obtained by dissolving 2,2'-azoiso(butyronitrile) (available from Tokyo Chemical Industry Co., Ltd.) (0.273 g (1.67 mmol)) in the remaining monomer solution was dropped in 1.5 hours. The resultant was stirred at 60° C. for 16 hours and then cooled to room temperature, and the obtained reaction solution was fed to hexane. A resultant deposited copolymer was filtered and dried at reduced pressure, to obtain a copolymer (8.13 parts by mass).

The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer i.

A weight average molecular weight of the obtained copolymer i measured in the same manner as in Copolymer Synthesis Example 1 was 30,600.

Copolymer Synthesis Example 10

Synthesis of Copolymer j

A monomer M-4 represented by a structural formula (b-4) below was obtained in the same manner as in Copolymer Synthesis Example 1, except that 1,6-hexanediol was changed to 1,16-hexadecanediol (available from Tokyo Chemical Industry Co., Ltd.) unlike in Copolymer Synthesis Example 1.

Structural formula (b-4)

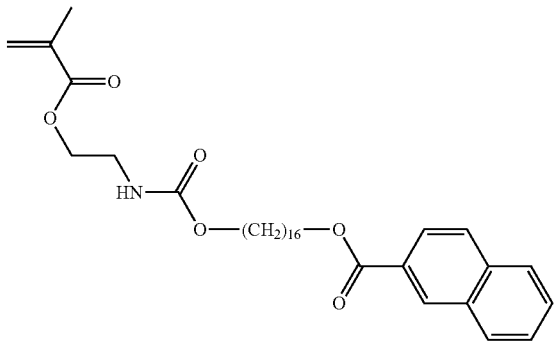

Next, acrylic acid (available from Sigma-Aldrich Corporation) (1.20 parts by mass (16.7 mmol)) and the monomer M-4 (7.12 parts by mass (16.7 mmol)) were dissolved in dry methyl ethyl ketone (40 mL), to prepare a monomer solution. Ten percent by mass of the monomer solution was heated to 75° C. under an argon gas stream. To this monomer solution, a solution obtained by dissolving 2,2'-azoiso(butyronitrile) (available from Tokyo Chemical Industry Co., Ltd.) (0.273 g (1.67 mmol)) in the remaining monomer solution was dropped in 1.5 hours. The resultant was stirred at 65° C. for 9 hours and then cooled to room temperature, and the obtained reaction solution was fed to hexane. A resultant deposited copolymer was filtered and dried at reduced pressure, to obtain a copolymer (8.13 parts by mass).

The obtained copolymer was dissolved in a tetraethylammonium hydroxide aqueous solution for acid neutralization of 100% of the copolymer, and subjected to concentration adjustment with ion-exchanged water such that the concentration of the copolymer would be 10% by mass, to obtain a solution of a copolymer j.

A weight average molecular weight of the obtained copolymer j measured in the same manner as in Copolymer Synthesis Example 1 was 15,200.

Copolymer Synthesis Example 11

Synthesis of Copolymer k

The monomer M-1 (64.1 parts by mass (150 mmol)) was dissolved in methacrylic acid (5.16 parts by mass (60.0 mmol)). To the resultant, ion-exchanged water (130 parts by mass), AQUALON KH-10 (an anionic radical reactive surfactant available from DKS Co., Ltd.) (4.00 parts by mass), and ammonium persulfate (1.30 parts by mass) were added, to form a pre-emulsion with a homomixer. Next, AQUALON KH-10 mentioned above (2.00 parts by mass) was added to ion-exchanged water (100 parts by mass), and the resultant was heated to 80° C. under an argon gas stream. To the resultant, 10% by mass of the pre-emulsion was added and made to undergo an initial polymerization for 30 minutes. To the resultant, the remaining pre-emulsion was dropped in 2 hours for polymerization. Then, the resultant was further polymerized at 80° C. for 2 hours. The resultant was cooled, filtrated, and neutralized with ammonia water, to obtain an additive O/W emulsion made of a copolymer k having a copolymer concentration of 30% by mass and a weight average molecular weight of 18,000.

Details of the copolymers a to k are presented in Table 1 collectively.

TABLE 1

| Copolymer No. | Ratio by mole (M1/M2) | $R^1$ | $R^2$ | M | L | Polymerization method | Weight average molecular weight Mw |
|---|---|---|---|---|---|---|---|
| a | 1.0 | H | $CH_3$ | TEA | $—(CH_2)_6—$ | Solution polymerization | 10,400 |
| b | 1.0 | H | $CH_3$ | TEA | $—(CH_2)_6—$ | Solution polymerization | 23,500 |
| c | 1.0 | H | $CH_3$ | TEA | $—(CH_2)_6—$ | Solution polymerization | 29,600 |

TABLE 1-continued

| Copolymer No. | Ratio by mole (M1/M2) | R¹ | R² | M | L | Polymerization method | Weight average molecular weight Mw |
|---|---|---|---|---|---|---|---|
| d | 1.0 | $CH_3$ | $CH_3$ | TEA | $—(CH_2)_6—$ | Solution polymerization | 9,300 |
| e | 0.5 | H | $CH_3$ | TEA | $—(CH_2)_6—$ | Solution polymerization | 23,000 |
| f | 3.0 | H | $CH_3$ | TEA | $—(CH_2)_6—$ | Solution polymerization | 22,800 |
| g | 4.0 | H | $CH_3$ | TEA | $—(CH_2)_6—$ | Solution polymerization | 23,300 |
| h | 1.0 | H | $CH_3$ | TEA | $—(CH_2)_2—$ | Solution polymerization | 8,700 |
| i | 1.0 | H | $CH_3$ | TEA | $—(CH_2)_{12}—$ | Solution polymerization | 30,600 |
| J | 1.0 | H | $CH_3$ | TEA | $—(CH_2)_{16}—$ | Solution polymerization | 15,200 |
| k | 0.4 | H | $CH_3$ | $NH_4$ | $—(CH_2)_6—$ | Emulsion polymerization | 18,000 |

*In Table 1, TEA represents an abbreviation of tetraethylammonium hydroxide.

Example 1

Preparation of Pigment Dispersion 1

Copper phthalocyanine pigment 1 (INK JET CYAN BG 10) (Pigment Blue 15:3 available from Clariant AG)—15.0 parts by mass
Pigment dispersant 1 represented by a structural formula (3) below—5.0 parts by mass
Ion-exchanged water—80.0 parts by mass The dispersant represented by the structural formula (3) was added and dissolved in ion-exchanged water, and to the resultant, the copper phthalocyanine pigment 1 (INK JET CYAN BG 10) was mixed and stirred. When the copper phthalocyanine pigment 1 was wetted sufficiently, the materials were kneaded with a kneader (DYNOMILL KDL A TYPE available from WAB Co.) filled with zirconia beads having a diameter of 0.5 mm at 2,000 rpm for 60 minutes. The resultant mill base was taken out and filtrated through a filter having an average pore diameter of 1 μm, to obtain a pigment dispersion 1.

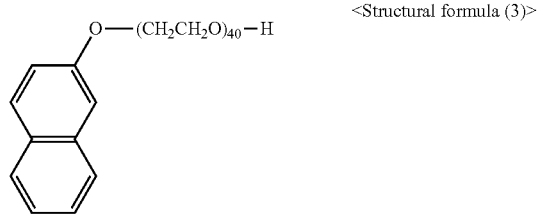

<Structural formula (3)>

<Ink Prescription and Ink Production>

Pigment dispersion 1 (with a pigment concentration of 15% by mass)—20.0 parts by mass
Ethylene glycol monobutylether—20.0 parts by mass
1,3-Butanediol—20.0 parts by mass
2-Ethyl-1,3-hexanediol—2.0 parts by mass
EMULGEN LS-106 (polyoxyethylene polyoxypropylene alkylether available from Kao Corporation)—1.0 part by mass
2-Amino-2-ethyl-1,3-propanediol—0.5 parts by mass
PROXEL LV (antiseptic/fungicide available from Arch Chemicals Japan Inc.)—0.1 parts by mass
Ion-exchanged water—36.4 parts by mass The materials prescribed above other than the pigment dispersion 1 were dissolved in ion-exchanged water to produce a vehicle. Then, the vehicle was mixed with the pigment dispersion 1, and the resultant was filtrated through a filter having an average pore diameter of 1 μm, to obtain a cyan ink of Example 1.

Example 2

Preparation of Pigment Dispersion 2

Copper phthalocyanine pigment 2 (HELIOGEN BLUE D7110F (Pigment Blue 15:4 available from BASF GmbH))—15.0 parts by mass
Pigment dispersant 2 (BYKJET-9151, a dispersant polymer with an effective component ratio of 100% available from Byk-Chemie GmbH)—5.0 parts by mass
Ion-exchanged water—80.0 parts by mass A pigment dispersion 2 was obtained in the same manner as in Example 1, except that the materials prescribed above were used.

<Ink Prescription and Ink Production>

Pigment dispersion 2 (with a pigment concentration of 15% by mass)—20.0 parts by mass
N,N-dimethyl-β-butoxypropionamide—15.0 parts by mass
Glycerin—15.0 parts by mass
3-Methyl-1,3-butanediol—10.0 parts by mass
2-Ethyl-1,3-hexanediol—2.0 parts by mass
EMULGEN LS-106 (polyoxyethylene polyoxypropylene alkylether available from Kao Corporation)—1.0 part by mass
2-Amino-2-ethyl-1,3-propanediol—0.5 parts by mass
PROXEL LV (antiseptic/fungicide available from Arch Chemicals Japan Inc.)—0.1 parts by mass
Ion-exchanged water—36.4 parts by mass The materials prescribed above other than the pigment dispersion 2 were dissolved in ion-exchanged water to produce a vehicle. Then, the vehicle was mixed with the pigment dispersion 2, and the resultant was filtrated through a filter having an average pore diameter of 1 μm, to obtain a cyan ink of Example 2.

Example 3

Preparation of Pigment Dispersion 3

Copper phthalocyanine pigment 3 (CYANINE BLUE A-220 (Pigment Blue 15:3 available from Dainichiseika Color & Chemicals Mfg. Co., Ltd.)—15.0 parts by mass
Solution of copolymer a described above (with a copolymer concentration of 10% by mass)—83.0 parts by mass
Ion-exchanged water—2.0 parts by mass A pigment dispersion 3 in which a mass ratio of the copper phthalocyanine pigment to the copolymer was 1.8 was obtained in the same manner as in Example 1, except that the materials prescribed above were used.

<Ink Prescription and Ink Production>
Pigment dispersion 3—20.0 parts by mass
Glycerin—15.0 parts by mass
1,3-Butanediol—20.0 parts by mass
2-Pyrrolidone—5.0 parts by mass
2-Ethyl-1,3-hexanediol—2.0 parts by mass
Fluorosurfactant represented by a general formula (2) below—0.5 parts by mass
2-Amino-2-ethyl-1,3-propanediol—0.5 parts by mass
PROXEL LV (antiseptic/fungicide available from Arch Chemicals Japan Inc.)—0.1 parts by mass
Ion-exchanged water—36.9 parts by mass

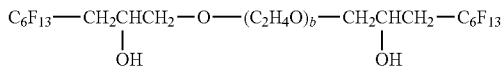

General formula (2)

In the general formula (2), b represents 8 or 9.

The materials prescribed above other than the pigment dispersion 3 were dissolved in ion-exchanged water to produce a vehicle. Then, the vehicle was mixed with the pigment dispersion 3, and the resultant was filtrated through a filter having an average pore diameter of 1 μm, to obtain a cyan ink of Example 3.

Example 4

Preparation of Pigment Dispersion 4

Copper phthalocyanine pigment 2 (HELIOGEN BLUE D7110F (Pigment Blue 15:4 available from BASF GmbH))—15.0 parts by mass
Solution of copolymer b described above (with a copolymer concentration of 10% by mass)—60.0 parts by mass
Ion-exchanged water—25.0 parts by mass A pigment dispersion 4 in which a mass ratio of the pigment to the copolymer was 2.5 was obtained in the same manner as in Example 1, except that the materials prescribed above were used.

<Ink Prescription and Ink Production>
Pigment dispersion 4—20.0 parts by mass
3-Ethyl-3-hydroxymethyloxetane—30.0 parts by mass
3-Methyl-1,3-butanediol—10.0 parts by mass
2-Ethyl-1,3-hexanediol—2.0 parts by mass
Fluorosurfactant represented by a general formula (1) below—0.5 parts by mass
2-Amino-2-ethyl-1,3-propanediol—0.5 parts by mass
PROXEL LV (antiseptic/fungicide available from Arch Chemicals Japan Inc.)—0.1 parts by mass
Ion-exchanged water—36.9 parts by mass

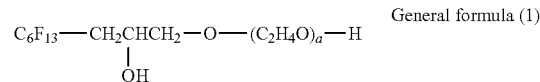

General formula (1)

In the general formula (1), a represents 8 or 9.

The materials prescribed above other than the pigment dispersion 4 were dissolved in ion-exchanged water to produce a vehicle. Then, the vehicle was mixed with the pigment dispersion 4, and the resultant was filtrated through a filter having an average pore diameter of 1 μm, to obtain a cyan ink of Example 4.

Example 5

Pigment Dispersion 5

Copper phthalocyanine pigment 1 (INK JET CYAN BG 10 (Pigment Blue 15:3 available from Clariant AG))—15.0 parts by mass
Solution of copolymer b described above (with a copolymer concentration of 10% by mass)—3.8 parts by mass
Ion-exchanged water—81.2 parts by mass A pigment dispersion 5 in which a mass ratio of the copper phthalocyanine pigment to the copolymer was 3.9 was obtained in the same manner as in Example 1, except that the materials prescribed above were used.

<Ink Production>
A cyan ink of Example 5 was obtained in the same manner as in Example 4, except that the pigment dispersion 4 of Example 4 was changed to the pigment dispersion 5.

Example 6

Preparation of Pigment Dispersion 6

Copper phthalocyanine pigment 3 (CYANINE BLUE A-220 (Pigment Blue 15:3 available from Dainichiseika Color & Chemicals Mfg. Co., Ltd.))—15.0 parts by mass
Solution of copolymer b (with a copolymer concentration of 10% by mass)—25.0 parts by mass
Ion-exchanged water—60.0 parts by mass A pigment dispersion 6 in which a mass ratio of the copper phthalocyanine pigment to the copolymer was 6.0 was obtained in the same manner as in Example 1, except that the materials prescribed above were used.

<Ink Production>
A cyan ink of Example 6 was obtained in the same manner as in Example 4, except that the pigment dispersion 4 of Example 4 was changed to the pigment dispersion 6.

Example 7

Preparation of Pigment Dispersion 7

Copper phthalocyanine pigment 4 (FASTOGEN BLUE TGR-SD (Pigment Blue 15:3 available from DIC Corporation))—15.0 parts by mass
Solution of copolymer b described above (with a copolymer concentration of 10% by mass)—30.0 parts by mass
Ion-exchanged water—55.0 parts by mass
A pigment dispersion 7 in which a mass ratio of the copper phthalocyanine pigment to the copolymer was 5.0 was obtained in the same manner as in Example 1, except that the materials prescribed above were used.

<Ink Production>

A cyan ink of Example 7 was obtained in the same manner as in Example 4, except that the pigment dispersion 4 of Example 4 was changed to the pigment dispersion 7.

Example 8

Preparation of Pigment Dispersion 8

Copper phthalocyanine pigment 1 (INK JET CYAN BG 10 (Pigment Blue 15:3 available from Clariant AG))—15.0 parts by mass
Solution of copolymer c described above (with a copolymer concentration of 10% by mass)—38.0 parts by mass
Ion-exchanged water—47.0 parts by mass
A pigment dispersion 8 in which a mass ratio of the copper phthalocyanine pigment to the copolymer was 3.9 was obtained in the same manner as in Example 1, except that the materials prescribed above were used.

<Ink Production>

A cyan ink of Example 8 was obtained in the same manner as in Example 3, except that the pigment dispersion 3 of Example 3 was changed to the pigment dispersion 8.

Example 9

Preparation of Pigment Dispersion 9

Copper phthalocyanine pigment 5 (HELIOGEN BLUE D7029 (Pigment Blue 15:3 available from BASF GmbH))—15.0 parts by mass
Solution of copolymer d described above (with a copolymer concentration of 10% by mass)—38.0 parts by mass
Ion-exchanged water—47.0 parts by mass
A pigment dispersion 9 in which a mass ratio of the copper phthalocyanine pigment to the copolymer was 3.9 was obtained in the same manner as in Example 1, except that the materials prescribed above were used.

<Ink Production>

A cyan ink of Example 9 was obtained in the same manner as in Example 2, except that the pigment dispersion 2 of Example 2 was changed to the pigment dispersion 9.

Example 10

Preparation of Pigment Dispersion 10

Copper phthalocyanine pigment 3 (CYANINE BLUE A-220 (Pigment Blue 15:3 available from Dainichiseika Color & Chemicals Mfg. Co., Ltd.))—15.0 parts by mass
Solution of copolymer e described above (with a copolymer concentration of 10% by mass)—38.0 parts by mass
Ion-exchanged water-47.0 parts by mass
A pigment dispersion 10 in which a mass ratio of the copper phthalocyanine pigment to the copolymer was 3.9 was obtained in the same manner as in Example 1, except that the materials prescribed above were used.

<Ink Production>

A cyan ink of Example 10 was obtained in the same manner as in Example 2, except that the pigment dispersion 2 of Example 2 was changed to the pigment dispersion 10.

Example 11

Preparation of Pigment Dispersion 11

Copper phthalocyanine pigment 2 (HELIOGEN BLUE D7110F (Pigment Blue 15:4 available from BASF GmbH))—15.0 parts by mass
Solution of copolymer f described above (with a copolymer concentration of 10% by mass)—38.0 parts by mass
Ion-exchanged water—47.0 parts by mass
A pigment dispersion 11 in which a mass ratio of the copper phthalocyanine pigment to the copolymer was 3.9 was obtained in the same manner as in Example 1, except that the materials prescribed above were used.

<Ink Production>

A cyan ink of Example 11 was obtained in the same manner as in Example 2, except that the pigment dispersion 2 of Example 2 was changed to the pigment dispersion 11.

Example 12

Preparation of Pigment Dispersion 12

Copper phthalocyanine pigment 6 (HOSTAPERM BLUE B4G (Pigment Blue 15:3 available from Clariant AG))—15.0 parts by mass
Solution of copolymer g (with a copolymer concentration of 10% by mass)—50.0 parts by mass
Ion-exchanged water—35.0 parts by mass
A pigment dispersion 12 in which a mass ratio of the copper phthalocyanine pigment to the copolymer was 3.0 was obtained in the same manner as in Example 1, except that the materials prescribed above were used.

<Ink Production>

A cyan ink of Example 12 was obtained in the same manner as in Example 3, except that the pigment dispersion 3 of Example 3 was changed to the pigment dispersion 12.

Example 13

Preparation of Pigment Dispersion 13

Copper phthalocyanine pigment 1 (INK JET CYAN BG 10 (Pigment Blue 15:3 available from Clariant AG))—15.0 parts by mass
Solution of copolymer h described above (with a copolymer concentration of 10% by mass)—75.0 parts by mass
Ion-exchanged water—10.0 parts by mass
A pigment dispersion 13 in which a mass ratio of the copper phthalocyanine pigment to the copolymer was 2.0 was obtained in the same manner as in Example 1, except that the materials prescribed above were used.

<Ink Production>

A cyan ink of Example 13 was obtained in the same manner as in Example 2, except that the pigment dispersion 2 of Example 2 was changed to the pigment dispersion 13.

Example 14

Preparation of Pigment Dispersion 14

Copper phthalocyanine pigment 2 (HELIOGEN BLUE D7110F (Pigment Blue 15:4 available from BASF GmbH))—15.0 parts by mass
Solution of copolymer i described above (with a copolymer concentration of 10% by mass)—23.0 parts by mass
Ion-exchanged water—62.0 parts by mass A pigment dispersion 14 in which a mass ratio of the pigment to the copolymer was 6.5 was obtained in the same manner as in Example 1, except that the materials prescribed above were used.

<Ink Production>

A cyan ink of Example 14 was obtained in the same manner as in Example 3, except that the pigment dispersion 3 of Example 3 was changed to the pigment dispersion 14.

Example 15

Preparation of Pigment Dispersion 15

Copper phthalocyanine pigment 4 (FASTOGEN BLUE TGR-SD (Pigment Blue 15:3 available from DIC Corporation))—15.0 parts by mass
Solution of copolymer j described above (with a copolymer concentration of 10% by mass)—38.0 parts by mass
Ion-exchanged water—47.0 parts by mass A pigment dispersion 15 in which a mass ratio of the copper phthalocyanine pigment to the copolymer was 3.9 was obtained in the same manner as in Example 1, except that the materials prescribed above were used.

<Ink Production>

A cyan ink of Example 15 was obtained in the same manner as in Example 3, except that the pigment dispersion 3 of Example 3 was changed to the pigment dispersion 15.

Example 16

Preparation of Pigment Dispersion 16

Copper phthalocyanine pigment 2 (HELIOGEN BLUE D7110F (Pigment Blue 15:4 available from BASF GmbH))—15.0 parts by mass
Oleum (28% by mass $SO_3$)—85.0 parts by mass The copper phthalocyanine pigment 2 (HELIOGEN BLUE D7110F) was fed to the oleum prescribed above with stirring at normal temperature. The resultant was stirred for 3 hours, poured into iced water (150 parts by mass), and left to stand for 30 minutes. A resultant generated product was filtrated and washed with pure water (300 parts by mass). Then, the generated product was fed to pure water (200 parts by mass), adjusted to pH of 7 or higher with ammonia water, and filtrated. A wet crystal obtained by the filtration was dried at 80° C., and then further subjected 10 times repeatedly to washing with pure water, filtration, and drying, to obtain a pigment dispersion 16 having a copper phthalocyanine pigment concentration of 15.0% by mass.

<Ink Prescription>

Pigment dispersion 16—20.0 parts by mass
Solution of copolymer k described above (with a copolymer concentration of 30% by mass)—5.0 parts by mass
Isopropylidene glycerol—15.0 parts by mass
Glycerin—15.0 parts by mass
3-Methyl-1,3-butanediol—10.0 parts by mass
2-Ethyl-1,3-hexanediol—2.0 parts by mass
EMULGEN LS-106 (polyoxyethylene polyoxypropylene alkylether available from Kao Corporation)—1.0 part by mass
2-Amino-2-ethyl-1,3-propanediol—0.5 parts by mass
PROXEL LV (antiseptic/fungicide available from Arch Chemicals Japan Inc.)—0.1 parts by mass
Ion-exchanged water—30.8 parts by mass The materials prescribed above other than the pigment dispersion 16 were dissolved in ion-exchanged water to produce a vehicle. Then, the vehicle was mixed with the pigment dispersion 16, and the resultant was filtrated through a filter having an average pore diameter of 1 μm, to obtain a cyan ink of Example 16. In the cyan ink of Example 16, a mass ratio of the pigment to the copolymer was 1.8.

Comparative Example 1

A cyan ink of Comparative Example 1 was obtained in the same manner as in Example 6, except that CYANINE BLUE A-220 used in Example 6 was changed to HOSTAPERM BLUE BT-729D (Pigment Blue 15:1 available from Clariant AG).

HOSTAPERM BLUE BT-729D mentioned above was a pigment with no local minimum absorbance in a wavelength range of from 665 nm through 675 nm.

Comparative Example 2

Preparation of Pigment Dispersion

A pigment dispersion was obtained in the same manner as in Example 14, except that the additive amount of the solution of the copolymer i was changed from 23.0 parts by mass of Example 14 to 83.0 parts by mass, the additive amount of the ion-exchanged water was changed from 62.0 parts by mass of Example 14 to 2.0 parts by mass, the mass ratio of the pigment to the copolymer was changed to 1.8, and the kneading time with the kneader DYNOMILL KDL A TYPE was changed from 60 minutes of Example 14 to 120 minutes.

<Ink Production>

A cyan ink of Comparative Example 2 was obtained in the same manner as in Example 14, except that the obtained pigment dispersion of Comparative Example 2 was used unlike in Example 14.

Comparative Example 3

A cyan ink of Comparative Example 3 was obtained in the same manner as in Example 9, except that HELIOGEN BLUE D7029 of Example 9 was changed to SAVINYL BLUE GLS (Solvent Blue 44 available from Clariant AG).

SAVINYL BLUE GLS mentioned above was a pigment with no local minimum absorbance in a wavelength range of from 665 nm through 675 nm.

Comparative Example 4

Preparation of Pigment Dispersion

A pigment dispersion was obtained in the same manner as in Example 2, except that the additive amount of the pigment dispersant 2 (BYKJET-9151, a dispersant polymer with an effective component ratio of 100% available from Byk-Chemie GmbH) was changed from 5.0 parts by mass of Example 2 to 2.0 parts by mass, the additive amount of the ion-exchanged water was changed from 80.0 parts by mass of Example 2 to 83.0 parts by mass, and the kneading time with the kneader DYNOMILL KDL A TYPE was changed from 60 minutes of Example 2 to 20 minutes.

<Ink Production>

A cyan ink of Comparative Example 4 was obtained in the same manner as in Example 2, except that the obtained pigment dispersion of Comparative Example 4 was used unlike in Example 2.

The ink prescriptions of Examples 1 to 16 and Comparative Examples 1 to 4 are presented in Table 2 to Table 6 collectively.

TABLE 2

| | | | Ex. 1 | Ex. 2 | Ex. 3 | Ex. 4 | Ex. 5 |
|---|---|---|---|---|---|---|---|
| Pigment dispersion | Copper phthalocyanine pigment 1 | | 15.0 | — | — | — | 15.0 |
| | Copper phthalocyanine pigment 2 | | — | 15.0 | — | 15.0 | — |
| | Copper phthalocyanine pigment 3 | | — | — | 15.0 | — | — |
| | Copper phthalocyanine pigment 4 | | — | — | — | — | — |
| | Copper phthalocyanine pigment 5 | | — | — | — | — | — |
| | Copper phthalocyanine pigment 6 | | — | — | — | — | — |
| | Comparative copper phthalocyanine pigment 1 | | — | — | — | — | — |
| | Comparative copper phthalocyanine pigment 2 | | — | — | — | — | — |
| | Pigment dispersant 1 | | 5.0 | — | — | — | — |
| | Pigment dispersant 2 | | — | 5.0 | — | — | — |
| | Copolymer (part by mass) | | — | — | a (83.0) | b (60.0) | b (3.8) |
| | Ion-exchanged water | | 80.0 | 80.0 | 2.0 | 25.0 | 81.2 |
| | Mass ratio (pigment/copolymer) | | — | — | 1.8 | 2.5 | 3.9 |
| | Pigment dispersion total (part by mass) | | 100 | 100 | 100 | 100 | 100 |
| Ink | Pigment dispersion | | 20.0 | 20.0 | 20.0 | 20.0 | 20.0 |
| | Water-soluble solvent | 3-ethyl-3-hydroxymethyloxetane | — | — | — | 30.0 | 30.0 |
| | | Isopropylidene glycerol | — | — | — | — | — |
| | | N,N-dimethyl-β-butoxypropionamide | — | 15.0 | — | — | — |
| | | Glycerin | — | 15.0 | 15.0 | — | — |
| | | Ethylene glycol monobutylether | 20.0 | — | — | — | — |
| | | 1,3-butanediol | 20.0 | — | 20.0 | — | — |
| | | 3-methyl-1,3-butanediol | — | 10.0 | — | 10.0 | 10.0 |
| | | 2-pyrrolidone | — | — | 5.0 | — | — |
| | | 2-ethyl-1,3-hexanediol | 2.0 | 2.0 | 2.0 | 2.0 | 2.0 |
| | Surfactant | Fluorosurfactant represented by general formula (1) | — | — | — | 0.5 | 0.5 |
| | | Fluorosurfactant represented by general formula (2) | — | — | 0.5 | — | — |
| | | EMULGEN LS-106 | 1.0 | 1.0 | — | — | — |
| | pH adjuster | 2-amino-2-ethyl-1,3-propanediol | 0.5 | 0.5 | 0.5 | 0.5 | 0.5 |
| | Antiseptic/fungicide | PROXEL LV | 0.1 | 0.1 | 0.1 | 0.1 | 0.1 |
| | Water | Ion-exchanged water | 36.4 | 36.4 | 36.9 | 36.9 | 36.9 |
| | Ink total (part by mass) | | 100 | 100 | 100 | 100 | 100 |

TABLE 3

| | | Ex. 6 | Ex. 7 | Ex. 8 | Ex. 9 | Ex. 10 |
|---|---|---|---|---|---|---|
| Pigment dispersion | Copper phthalocyanine pigment 1 | — | — | 15.0 | — | — |
| | Copper phthalocyanine pigment 2 | — | — | — | — | — |
| | Copper phthalocyanine pigment 3 | 15.0 | — | — | — | 15.0 |
| | Copper phthalocyanine pigment 4 | — | 15.0 | — | — | — |
| | Copper phthalocyanine pigment 5 | — | — | — | 15.0 | — |
| | Copper phthalocyanine pigment 6 | — | — | — | — | — |
| | Comparative copper phthalocyanine pigment 1 | — | — | — | — | — |
| | Comparative copper phthalocyanine pigment 2 | — | — | — | — | — |
| | Pigment dispersant 1 | — | — | — | — | — |

TABLE 3-continued

|  |  | Ex. 6 | Ex. 7 | Ex. 8 | Ex. 9 | Ex. 10 |
|---|---|---|---|---|---|---|
|  | Pigment dispersant 2 | — | — | — | — | — |
|  | Copolymer (part by mass) | b (25.0) | b (30.0) | c (38.0) | d (38.0) | e (38.0) |
|  | Ion-exchanged water | 60.0 | 55.0 | 47.0 | 47.0 | 47.0 |
|  | Mass ratio (pigment/copolymer) | 6.0 | 5.0 | 3.9 | 3.9 | 3.9 |
| Ink | Pigment dispersion total (part by mass) | 100 | 100 | 100 | 100 | 100 |
|  | Pigment dispersion | 20.0 | 20.0 | 20.0 | 20.0 | 20.0 |
| Water-soluble solvent | 3-ethyl-3-hydroxymethyloxetane | 30.0 | 30.0 | — | — | — |
|  | Isopropylidene glycerol | — | — | — | — | — |
|  | N,N-dimethyl-β-butoxypropionamide | — | — | — | 15.0 | 15.0 |
|  | Glycerin | — | — | 15.0 | 15.0 | 15.0 |
|  | Ethylene glycol monobutylether | — | — | — | — | — |
|  | 1,3-butanediol | — | — | 20.0 | — | — |
|  | 3-methyl-1,3-butanediol | 10.0 | 10.0 | — | 10.0 | 10.0 |
|  | 2-pyrrolidone | — | — | 5.0 | — | — |
|  | 2-ethyl-1,3-hexanediol | 2.0 | 2.0 | 2.0 | 2.0 | 2.0 |
| Surfactant | Fluorosurfactant represented by general formula (1) | 0.5 | 0.5 | — | — | — |
|  | Fluorosurfactant represented by general formula (2) | — | — | 0.5 | — | — |
|  | EMULGEN LS-106 | — | — | — | 1.0 | 1.0 |
| pH adjuster | 2-amino-2-ethyl-1,3-propanediol | 0.5 | 0.5 | 0.5 | 0.5 | 0.5 |
| Antiseptic/fungicide | PROXEL LV | 0.1 | 0.1 | 0.1 | 0.1 | 0.1 |
| Water | Ion-exchanged water | 36.9 | 36.9 | 36.9 | 36.4 | 36.4 |
|  | Ink total (part by mass) | 100 | 100 | 100 | 100 | 100 |

TABLE 4

|  |  | Ex. 11 | Ex. 12 | Ex. 13 | Ex. 14 |
|---|---|---|---|---|---|
| Pigment dispersion | Copper phthalocyanine pigment 1 | — | — | 15.0 | — |
|  | Copper phthalocyanine pigment 2 | 15.0 | — | — | 15.0 |
|  | Copper phthalocyanine pigment 3 | — | — | — | — |
|  | Copper phthalocyanine pigment 4 | — | — | — | — |
|  | Copper phthalocyanine pigment 5 | — | — | — | — |
|  | Copper phthalocyanine pigment 6 | — | 15.0 | — | — |
|  | Comparative copper phthalocyanine pigment 1 | — | — | — | — |
|  | Comparative copper phthalocyanine pigment 2 | — | — | — | — |
|  | Pigment dispersant 1 | — | — | — | — |
|  | Pigment dispersant 2 | — | — | — | — |
|  | Copolymer (part by mass) | f (38.0) | g (50.0) | h (75.0) | i (23.0) |
|  | Ion-exchanged water | 47.0 | 35.0 | 10.0 | 62.0 |
|  | Mass ratio (pigment/copolymer) | 3.9 | 3.0 | 2.0 | 6.5 |
| Ink | Pigment dispersion total (part by mass) | 100 | 100 | 100 | 100 |
|  | Pigment dispersion | 20.0 | 20.0 | 20.0 | 20.0 |
| Water-soluble solvent | 3-ethyl-3-hydroxymethyloxetane | — | — | — | — |
|  | Isopropylidene glycerol | — | — | — | — |
|  | N,N-dimethyl-β-butoxypropionamide | 15.0 | — | 15.0 | — |
|  | Glycerin | 15.0 | 15.0 | 15.0 | 15.0 |
|  | Ethylene glycol monobutylether | — | — | — | — |
|  | 1,3-butanediol | — | 20.0 | — | 20.0 |
|  | 3-methyl-1,3-butanediol | 10.0 | — | 10.0 | — |
|  | 2-pyrrolidone | — | 5.0 | — | 5.0 |
|  | 2-ethyl-1,3-hexanediol | 2.0 | 2.0 | 2.0 | 2.0 |
| Surfactant | Fluorosurfactant represented by general formula (1) | — | — | — | — |
|  | Fluorosurfactant represented by general formula (2) | — | 0.5 | — | 0.5 |
|  | EMULGEN LS-106 | 1.0 | — | 1.0 | — |
| pH adjuster | 2-amino-2-ethyl-1,3-propanediol | 0.5 | 0.5 | 0.5 | 0.5 |
| Antiseptic/fungicide | PROXEL LV | 0.1 | 0.1 | 0.1 | 0.1 |
| Water | Ion-exchanged water | 36.4 | 36.9 | 36.4 | 36.9 |
|  | Ink total (part by mass) | 100 | 100 | 100 | 100 |

TABLE 5

|  |  | Ex. 15 |
|---|---|---|
| Pigment dispersion | Copper phthalocyanine pigment 1 | — |
|  | Copper phthalocyanine pigment 2 | — |
|  | Copper phthalocyanine pigment 3 | — |
|  | Copper phthalocyanine pigment 4 | 15.0 |

TABLE 5-continued

|  |  | Ex. 15 |
|---|---|---|
| | Copper phthalocyanine pigment 5 | — |
| | Copper phthalocyanine pigment 6 | — |
| | Comparative copper phthalocyanine pigment 1 | — |
| | Comparative copper phthalocyanine pigment 2 | — |
| | Pigment dispersant 1 | — |
| | Pigment dispersant 2 | — |
| | Copolymer (part by mass) | j (38.0) |
| | Ion-exchanged water | 47.0 |
| | Mass ratio (pigment/copolymer) | 3.9 |
| | Pigment dispersion total (part by mass) | 100 |
| Ink | Pigment dispersion | 20.0 |
| | Water-soluble solvent: 3-ethyl-3-hydroxymethyloxetane | — |
| | Isopropylidene glycerol | — |
| | N,N-dimethyl-β-butoxypropionamide | — |
| | Glycerin | 15.0 |
| | Ethylene glycol monobutylether | — |
| | 1,3-butane diol | 20.0 |
| | 3-methyl-1,3-butanediol | — |
| | 2-pyrrolidone | 5.0 |
| | 2-ethyl-1,3-hexanediol | 2.0 |
| | Surfactant: Fluorosurfactant represented by general formula (1) | — |
| | Fluorosurfactant represented by general formula (2) | 0.5 |
| | EMULGEN LS-106 | — |
| | pH adjuster: 2-amino-2-ethyl-1,3-propanediol | 0.5 |
| | Antiseptic/fungicide: PROXEL LV | 0.1 |
| | Water: Ion-exchanged water | 36.9 |
| | Ink total (part by mass) | 100 |

Copper phthalocyanine pigment having local maximum absorbance in wavelength range of from 610 nm through 620 nm and local minimum absorbance in wavelength range of from 665 nm through 675 nm—

Copper phthalocyanine pigment 1: product name: INK JET CYAN BG 10 (Pigment Blue 15:3 available from Clariant AG)

Copper phthalocyanine pigment 2: product name: HELIOGEN BLUE D7110F (Pigment Blue 15:4 available from BASF GmbH)

Copper phthalocyanine pigment 3: CYANINE BLUE A-220 (Pigment Blue 15:3 available from Dainichiseika Color & Chemicals Mfg. Co., Ltd.)

Copper phthalocyanine pigment 4: product name: FASTOGEN BLUE TGR-SD (Pigment Blue 15:3 available from DIC Corporation)

Copper phthalocyanine pigment 5: product name: HELIOGEN BLUE D7029 (Pigment Blue 15:3 available from BASF GmbH)

Copper phthalocyanine pigment 6: product name: HOSTAPERM BLUE B4G (Pigment Blue 15:3 available from Clariant AG)

Comparative copper phthalocyanine pigment having local maximum absorbance in wavelength range of from 610 nm through 620 nm and no local minimum absorbance in wavelength range of from 665 nm through 675 nm—

Comparative copper phthalocyanine pigment 1: product name: HOSTAPERM BLUE BT-729D (Pigment Blue 15:1 available from Clariant AG)

TABLE 6

| | | Comp. Ex. 1 | Comp. Ex. 2 | Comp. Ex. 3 | Comp. Ex. 4 |
|---|---|---|---|---|---|
| Pigment dispersion | Copper phthalocyanine pigment 1 | — | — | — | — |
| | Copper phthalocyanine pigment 2 | — | 15.0 | — | 15.0 |
| | Copper phthalocyanine pigment 3 | — | — | — | — |
| | Copper phthalocyanine pigment 4 | — | — | — | — |
| | Copper phthalocyanine pigment 5 | — | — | — | — |
| | Copper phthalocyanine pigment 6 | — | — | — | — |
| | Comparative copper phthalocyanine pigment 1 | 15.0 | — | — | — |
| | Comparative copper phthalocyanine pigment 2 | — | — | 15.0 | — |
| | Pigment dispersant 1 | — | — | — | — |
| | Pigment dispersant 2 | — | — | — | 2.0 |
| | Copolymer (part by mass) | b (25.0) | i (83.0) | d (38.0) | — |
| | Ion-exchanged water | 60.0 | 2.0 | 47.0 | 83.0 |
| | Mas ratio (pigment/copolymer) | 6.0 | 1.8 | 3.9 | — |
| | Pigment dispersion total (part by mass) | 100 | 100 | 100 | 100 |
| Ink | Pigment dispersion | 20.0 | 20.0 | 20.0 | 20.0 |
| | Water-soluble solvent: 3-ethyl-3-hydroxymethyloxetane | 30.0 | — | — | — |
| | Isopropylidene glycerol | — | — | 15.0 | 15.0 |
| | N,N-dimethyl-β-butoxypropionamide | — | — | 15.0 | 15.0 |
| | Glycerin | — | 15.0 | 15.0 | 15.0 |
| | Ethylene glycol monobutylether | — | — | — | — |
| | 1,3-butanediol | — | 20.0 | — | — |
| | 3-methyl-1,3-butanediol | 10.0 | — | 10.0 | 10.0 |
| | 2-pyrrolidone | — | 5.0 | — | — |
| | 2-ethyl-1,3-hexanediol | 2.0 | 2.0 | 2.0 | 2.0 |
| | Surfactant: Fluorosurfactant represented by general formula (1) | 0.5 | — | — | — |
| | Fluorosurfactant represented by general formula (2) | — | 0.5 | — | — |
| | EMULGEN LS-106 | — | — | 1.0 | 1.0 |
| | pH adjuster: 2-amino-2-ethyl-1,3-propanediol | 0.5 | 0.5 | 0.5 | 0.5 |
| | Antiseptic/fungicide: PROXEL LV | 0.1 | 0.1 | 0.1 | 0.1 |
| | Water: Ion-exchanged water | 36.9 | 36.9 | 36.4 | 36.4 |
| | Ink total (part by mass) | 100 | 100 | 100 | 100 |

Comparative copper phthalocyanine pigment 2: product name: SAVINYL BLUE GLS (Solvent Blue 44 available from Clariant AG)

—Dispersant—

Pigment dispersant 1: a compound represented by a structural formula (3) below

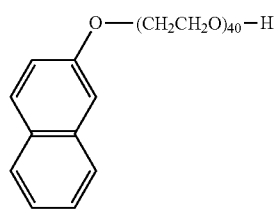

<Structural formula (3)>

Pigment dispersant 2: a dispersant polymer (BYKJET-9151 with an effective component ratio of 100% by mass available from Byk-Chemie GmbH)

Next, each of the inks produced was measured and evaluated in the manners described below. The results are presented in Table 7 and Table 8.

<Ink Storage Stability>

An ink stored container was filled with each ink, and the ink was stored at 70° C. for 14 days. A viscosity change rate of a viscosity after storage to a viscosity before storage was calculated according to a mathematical formula below and evaluated according to criteria described below. A viscometer (RE80L available from Toki Sangyo Co., Ltd.) was used for measurement of viscosity. A viscosity at 25° C. was measured at 50 rotations or 100 rotations.

$$\text{Viscosity change rate (\%)} = \frac{\text{ink viscosity after storage} - \text{ink viscosity before storage}}{\text{ink viscosity before storage}} \times 100$$

[Evaluation Criteria]
A: The viscosity change rate was within ±5%.
B: The viscosity change rate was out of ±5% but within ±10%.
C: The viscosity change rate was out of ±10% but within ±30%.
D: The viscosity change rate was out of ±30% (the ink gelated and was unevaluable).

<Measurement of Absorbance>

A spectrophotometer (U-3310 available from Hitachi, Ltd.) was used for measurement of absorbance. Each of the measurement target inks had a pigment concentration of 3.0% by mass, which was too high to measure the absorbance of the ink in an undiluted state of the ink. Hence, the ink was diluted 600 fold with pure water before the measurement, put in a cell made of quartz glass having an optical path length of 10 mm, and then subjected to the measurement. Pure water was used as a reference.

A visible light range (in a wavelength range of from 340 nm through 800 nm) was scanned at intervals of 5 nm or less to obtain a spectroscopic absorption spectrum.

FIG. 1 plots a spectroscopic absorption spectrum of the ink of Example 4. A local maximum absorbance X in a wavelength range of from 610 nm through 620 nm and a local minimum absorbance Yin a wavelength range of from 665 nm through 675 nm were found from FIG. 1 to calculate an absorbance ratio (Y/X). The result is presented in Table 7.

Figure 2:
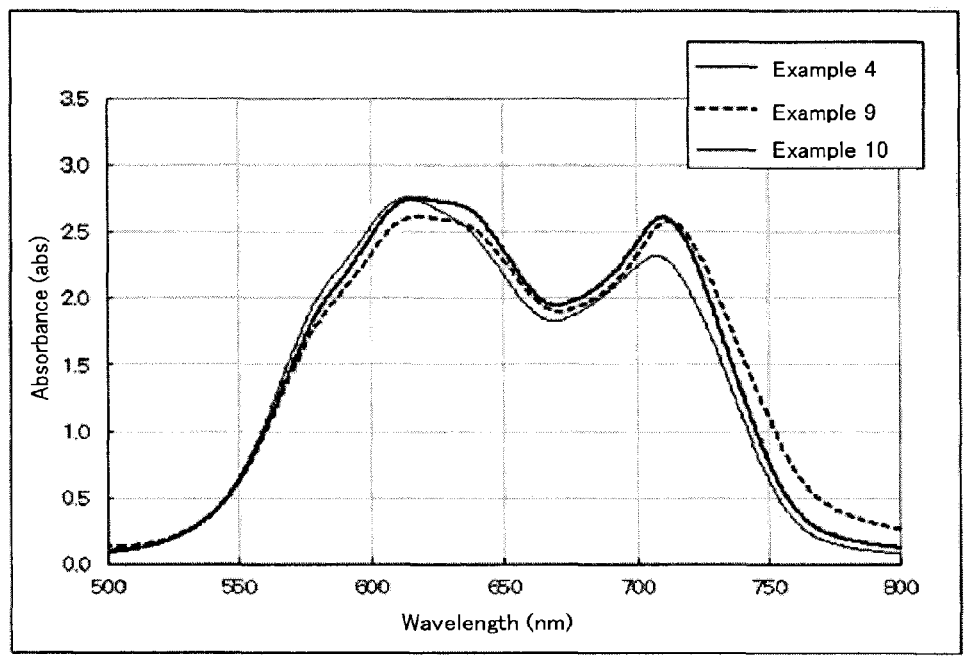
FIG. 2 is a graph of absorption spectra of copper phthalocyanine pigments of Examples 4, 9, and 10.
Figure 3:
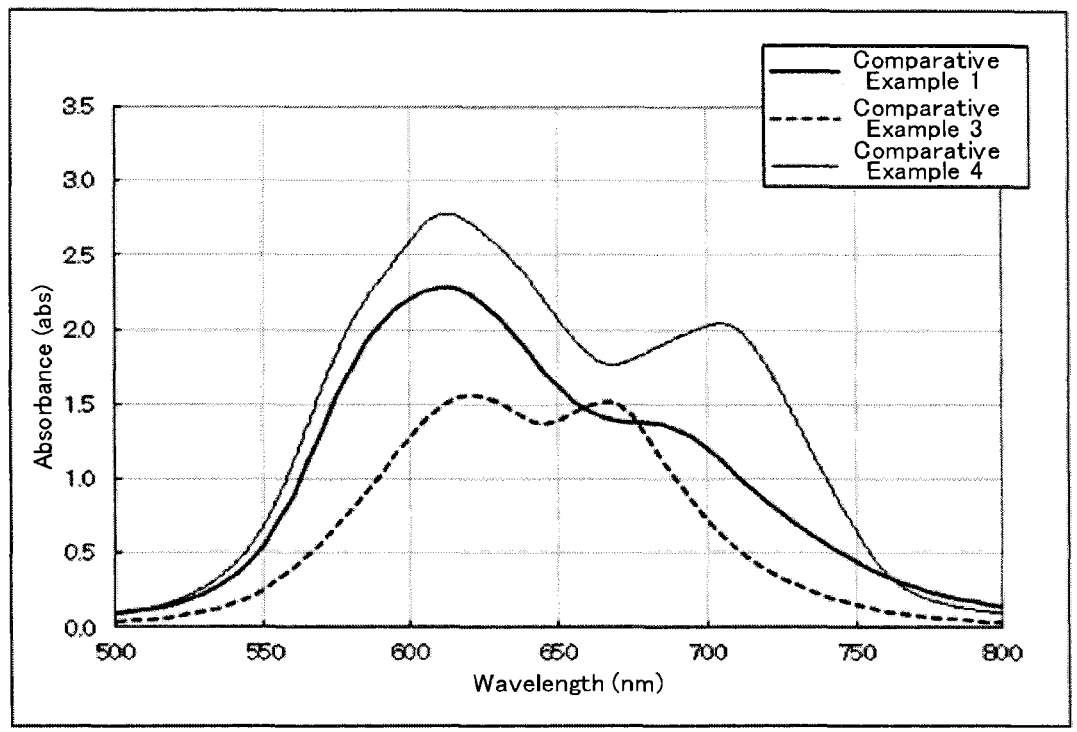
FIG. 3 is a graph of absorption spectra of copper phthalocyanine pigments of Comparative Examples 1, 3, and 4.

Measurement of absorbance was performed in the same manner, and absorption spectra of Example 4, Example 9, and Example 10 were plotted in FIG. 2. Furthermore, measurement of absorbance was performed in the same manner, and absorption spectra of Comparative Example 1, Comparative Example 3, and Comparative Example 4 were plotted in FIG. 3.

<a* Value (Degree of Greenish Hue)>

With an inkjet printer (IPSIO GX-E5500 available from Ricoh Co., Ltd.), a solid image was printed with each ink over an evaluation sheet identified below at a recording density of 1,200 dpi×1,200 dpi. After the solid image was dried, L*a*b* values were measured with a reflective/color spectrophotometric densitometer (available from X-Rite Inc.). The a* value was evaluated according to evaluation criteria described below. Ranks A and B are tolerable ranges.

[Evaluation Sheet]
Coated paper a: OK TOP COAT+(available from Oji Paper Co., Ltd.)

[Evaluation Criteria]
A: a*<−34.0
B: −34.0a*<−32.0
C: −32.0a*<−30.0
D: −30.0a*

<Measurement of Color Difference ΔE>

With an inkjet printer (IPSIO GX-E5500 available from Ricoh Co., Ltd.), a solid image was printed with each ink over evaluation sheets identified below at a recording density of 1,200 dpi×1,200 dpi. After the solid image was dried, L*a*b* values were measured with a reflective/color spectrophotometric densitometer (available from X-Rite Inc.). A color difference ΔE between the measured values and the cyan color (L*: 53.9, a*: −37.5, and b*: −50.4) of the standard color (Japan color ver. 2) was calculated according to a mathematical formula below and evaluated according to evaluation criteria described below. Ranks A and B are tolerable ranges.

$$\text{Color difference } \Delta E = \sqrt{\{(\Delta L^*)^2 + (\Delta a^*)^2 + (\Delta b^*)^2\}}$$

[Evaluation Sheets]
Coated paper a: OK TOP COAT+(available from Oji Paper Co., Ltd.)
Coated paper b: POD GLOSS COAT 100 G/M² paper (available from Oji Paper Co., Ltd.)

[Evaluation Criteria]
A: ΔE<3.2
B: 3.2≤ΔE<6.5
C: 6.5≤ΔE<10.0
D: 10.0≤ΔE

<Evaluation of Discharging Stability>

Each ink was set in an inkjet printer (IPSIO GX-E5500 available from Ricoh Co., Ltd.) and used for continuous printing for 10 minutes. The surface of a head was capped for moisture retention with the ink adhering to the surface, and the inkjet printer was left to stand under 50° C. and 60% RH conditions for 1 month. Then, the inkjet printer was cleaned and restored to the same state as before the leaving to stand. Then, a print pattern chart was printed continuously over 20 sheets, and the inkjet printer was suspended out of printing for 20 minutes. The printing and suspending were repeated 50 times to print the print pattern chart over a total of 1,000 sheets. After this, the same chart was printed over one more sheet, and a 5% chart solid portion of the printed chart was visually observed for presence or absence of streak, white void, and jetting disorder to evaluate discharging stability according to criteria described below. Ranks A and B are tolerable levels.

The print pattern chart was printed at a duty of 100% for each ink with each color printed over an area of 5% of the entire area of the sheet surface. As a printing condition, a recording density was set to 1,200 dpi×1,200 dpi.

[Evaluation Criteria]

A: At least any of streak, white void, and jetting disorder was absent in the solid portion.

B: At least any of streak, white void, and jetting disorder was slightly observed in the solid portion.

C: At least any of streak, white void, and jetting disorder was observed in the solid portion.

D: At least any of streak, white void, and jetting disorder was observed throughout the solid portion.

<Evaluation of Beading (Density Unevenness)>

The solid image over the coated paper b used for the measurement of L*a*b* values was used. The solid image was visually observed from a distance of 20 cm or more for a degree of density unevenness, and beading was evaluated according to criteria described below. Ranks A and B are tolerable levels.

[Evaluation Sheet]

Coated paper b: POD GLOSS COAT 100 G/M² paper (available from Oji Paper Co., Ltd.)

[Evaluation Criteria]

A: Density unevenness could not be observed.

B: Density unevenness could be observed but was uniform.

C: Nonuniform density unevenness (spotty pattern) could be observed.

D: Nonuniform density unevenness (spotty pattern) could be observed, and the background could be seen.

TABLE 7

| | Local maximum absorbance (from 610 nm through 620 nm) | | Local minimum absorbance (from 665 nm through 675 nm) | | Absorbance ratio (Y/X) |
|---|---|---|---|---|---|
| | Wavelength (nm) | Absorbance X | Wavelength (nm) | Absorbance Y | |
| Ex. 1 | 613.5 | 2.701 | 669.5 | 1.788 | 0.662 |
| Ex. 2 | 613.0 | 2.650 | 669.0 | 1.796 | 0.678 |
| Ex. 3 | 616.0 | 2.763 | 669.5 | 1.947 | 0.705 |
| Ex. 4 | 618.0 | 2.779 | 670.5 | 1.991 | 0.716 |
| Ex. 5 | 615.0 | 2.743 | 669.5 | 1.873 | 0.683 |
| Ex. 6 | 613.0 | 2.814 | 669.0 | 1.861 | 0.661 |
| Ex. 7 | 615.0 | 2.822 | 670.0 | 1.869 | 0.662 |
| Ex. 8 | 615.5 | 2.703 | 669.5 | 1.873 | 0.693 |
| Ex. 9 | 618.5 | 2.617 | 671.0 | 1.906 | 0.728 |
| Ex. 10 | 613.5 | 2.750 | 668.5 | 1.832 | 0.666 |
| Ex. 11 | 618.0 | 2.678 | 669.5 | 1.919 | 0.717 |
| Ex. 12 | 615.0 | 2.619 | 669.5 | 1.821 | 0.695 |
| Ex. 13 | 613.0 | 2.701 | 669.5 | 1.900 | 0.703 |
| Ex. 14 | 618.0 | 2.690 | 670.0 | 1.991 | 0.740 |
| Ex. 15 | 615.0 | 2.655 | 670.0 | 1.822 | 0.686 |
| Ex. 16 | 615.0 | 2.811 | 669.0 | 1.940 | 0.690 |
| Comp. Ex. 1 | 610.0 | 2.285 | — | None | — |
| Comp. Ex. 2 | 619.0 | 2.611 | 671.5 | 1.958 | 0.750 |
| Comp. Ex. 3 | 619.5 | 1.723 | 646.0 | 1.509 | 0.875 |
| Comp. Ex. 4 | 613.0 | 2.778 | 668.5 | 1.766 | 0.636 |

TABLE 8

| | a* value | Color difference ΔE from Japan color | | Ink storage stability | Discharging stability | Beading (density unevenness) |
|---|---|---|---|---|---|---|
| | | Coated paper a | Coated paper b | | | |
| Ex. 1 | B | B | B | B | B | B |
| Ex. 2 | B | B | B | B | B | B |
| Ex. 3 | A | A | A | B | B | B |
| Ex. 4 | A | A | A | A | A | A |
| Ex. 5 | A | A | A | A | A | A |
| Ex. 6 | B | B | B | A | A | B |
| Ex. 7 | B | B | B | A | A | B |
| Ex. 8 | A | A | A | A | A | B |
| Ex. 9 | A | A | B | B | A | A |
| Ex. 10 | B | A | A | A | A | B |
| Ex. 11 | B | A | A | A | A | B |
| Ex. 12 | B | B | B | B | B | B |
| Ex. 13 | B | A | B | B | A | B |
| Ex. 14 | A | B | B | B | A | B |
| Ex. 15 | A | A | A | A | A | B |
| Ex. 16 | B | A | B | B | A | B |
| Comp. Ex. 1 | D | C | D | A | B | A |
| Comp. Ex. 2 | C | D | C | B | B | B |
| Comp. Ex. 3 | B | C | B | C | A | B |
| Comp. Ex. 4 | C | D | D | B | B | C |

From the results of Table 7 and Table 8, it can be seen that Examples 1 to 16 could reproduce a more favorable greenish hue than Comparative Examples 1 to 4, could provide an excellent image in which no beading occurred, and was excellent in ink storage stability and discharging stability.

Aspects of the present invention are as follows, for example.

<1> An ink including a copper phthalocyanine pigment, wherein an absorbance ratio (Y/X) of a local minimum absorbance Y of the ink in a wavelength range of from 665 nm through 675 nm to a local maximum absorbance X of the ink in a wavelength range of from 610 nm through 620 nm is 0.660 or greater but 0.740 or less.

<2> The ink according to <1>, further including:

a water-soluble solvent;

a copolymer; and water, wherein the copolymer contains a structural unit represented by a general formula (a) below and a structural unit represented by a general formula (b) below, General formula (a)

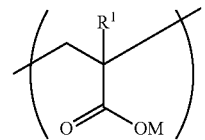

where in the general formula (a), $R^1$ represents a hydrogen atom or a methyl group and M represents a hydrogen atom or a cation, General formula (b)

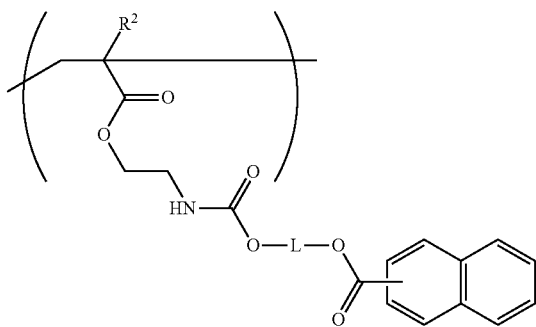

where in the general formula (b), $R^2$ represents a hydrogen atom or a methyl group and L represents an alkylene group containing 2 through 18 carbon atoms.

<3> The ink according to <2>,
wherein a ratio (M1/M2) of an amount M1 by mole of the structural unit represented by the general formula (a) to an amount M2 by mole of the structural unit represented by the general formula (b) in the copolymer is 0.5 or greater but 3 or less.

<4> The ink according to <2> or <3>,
wherein a weight average molecular weight of the copolymer is 10,000 or greater but 30,000 or less.

<5> The ink according to any one of <2> to <4>,
wherein a ratio by mass (WA) of a content B (% by mass) of the copper phthalocyanine pigment to a content A (% by mass) of the copolymer is 2.0 or greater but 6.0 or less.

<6> The ink according to any one of <2> to <5>,
wherein the water-soluble solvent contains at least one selected from the group consisting of 3-ethyl-3-hydroxymethyloxetane, isopropylidene glycerol, N,N-dimethyl-β-butoxypropionamide, glycerin, ethylene glycol monobutylether, 1,3-butanediol, 3-methyl-1,3-butanediol, 2-pyrrolidone, and 2-ethyl-1,3-hexanediol.

<7> The ink according to any one of <2> to <6>,
wherein the water-soluble solvent contains at least one selected from the group consisting of 3-ethyl-3-hydroxymethyloxetane, isopropylidene glycerol, and N,N-dimethyl-β-butoxypropionamide.

<8> The ink according to any one of <1> to <7>, further including
a fluorosurfactant,
wherein the fluorosurfactant is at least one of a compound represented by a general formula (1) below and a compound represented by a general formula (2) below,

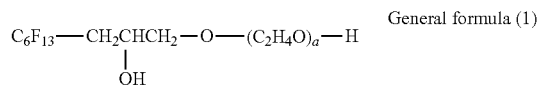

General formula (1)

where in the general formula (1), a represents 8 or 9,

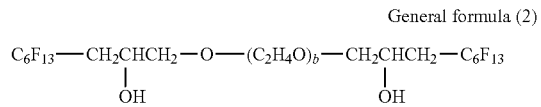

General formula (2)

where in the general formula (2), b represents 8 or 9.

<9> The ink according to any one of <2> to <8>,
wherein a content of the copper phthalocyanine pigment is 0.5% by mass or greater but 10% by mass or less.

<10> The ink according to any one of <1> to <9>,
wherein a color difference ΔE between the ink and a cyan hue (L*: 53.9, a*: −37.5, and b*: −50.4) of a standard color (Japan color ver. 2) is 3.2 or greater but 6.5 or less, where the color difference ΔE is represented by $SQR\{(\Delta L^*)^2+(\Delta a^*)^2+(\Delta b^*)^2\}$.

<11> The ink according to any one of <2> to <10>,
wherein a mass ratio ((a)/(b)) of the structural unit represented by the general formula (a) to the structural unit represented by the general formula (b) is 37 or greater but 98 or less.

<12> The ink according to any one of <2> to <11>,
wherein the copper phthalocyanine pigment is C.I Pigment Blue 15:3 or C.I. Pigment Blue 15:4.

<13> The ink according to any one of <2> to <12>,
wherein a content of the water-soluble solvent is 20% by mass or greater but 50% by mass or less.

<14> The ink according to any one of <2> to <13>,
wherein M in the general formula (a) represents a tetraethylammonium ion.

<15> An ink stored container including:
the ink according to any one of <1> to <14>; and
a container storing the ink.

<16> An inkjet recording apparatus including:
the ink stored container according to <15>: and
a discharging unit configured to discharge the ink supplied from the ink stored container.

<17> An inkjet recording method involving use of an inkjet recording apparatus including the ink stored container of the present invention, the inkjet recording method including a discharging step of discharging an ink supplied from the ink stored container.

<18> The inkjet recording method according to <17>,
wherein a recording medium is coated paper for printing.

<19> A recorded matter including:
a recording medium; and
an image recorded over the recording medium with the ink according to any one of <1> to <14>.

<20> The recorded matter according to <19>,
wherein the recording medium is coated paper for printing.

The ink according to any one of <1> to <14>, the ink stored container according to <15>, the inkjet recording apparatus according to <16>, the inkjet recording method according to <17> or <18>, and the recorded matter according to <19> or <20> can solve the various problems in the related art and achieve the object of the present invention.

What is claimed is:
1. An ink comprising:
a copper phthalocyanine pigment,
a water-soluble solvent;
a copolymer; and
water,
wherein an absorbance ratio (Y/X) of a local minimum absorbance Y of the ink in a wavelength range of from 665 nm to 675 nm to a local maximum absorbance X of the ink in a wavelength range of from 610 nm to 620 nm is from 0.660 to 0.740,
wherein the copolymer comprises a structural unit represented by the formula (a) and a structural unit represented by the formula (b):

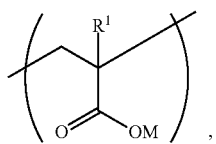

Formula (a)

wherein $R^1$ represents a hydrogen atom or a methyl group and M represents a hydrogen atom or a cation,

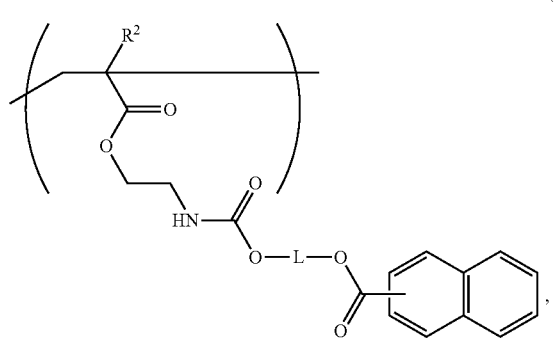

Formula (b)

wherein $R^2$ represents a hydrogen atom or a methyl group and L represents an alkylene group that comprises 2 through 18 carbon atoms.

2. The ink according to claim 1, wherein a ratio (M1/M2) of an amount M1 by mole of the structural unit represented by the formula (a) to an amount M2 by mole of the structural unit represented by the formula (b) in the copolymer is from 0.5 to 3.

3. The ink according to claim 1, wherein a weight average molecular weight of the copolymer is from 10,000 to 30,000.

4. The ink according to claim 1, wherein a ratio by mass (B/A) of a content B, % by mass, of the copper phthalocyanine pigment to a content A, % by mass, of the copolymer is from 2.0 to 6.0.

5. The ink according to claim 1, wherein the water-soluble solvent comprises at least one selected from the group consisting of 3-ethyl-3-hydroxymethyloxetane, isopropylidene glycerol, and N,N-dimethyl-β-butoxypropionamide.

6. The ink according to claim 1, further comprising a fluorosurfactant,
wherein the fluorosurfactant comprises at least one of a compound represented by the formula (1) and a compound represented by the formula (2):

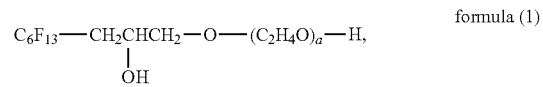

formula (1)

wherein a is 8 or 9,

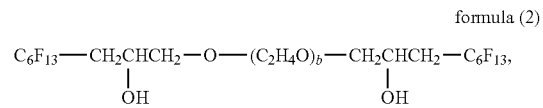

formula (2)

wherein b is 8 or 9.

7. An ink stored container comprising:
the ink of claim 1; and
a container storing the ink.

8. An inkjet recording apparatus comprising:
the ink stored container according to claim 7; and
a discharging unit configured to discharge the ink supplied from the ink stored container.

9. A recorded matter comprising:
a recording medium; and
the image recorded over the recording medium with an ink of claim 1.

* * * * *